(12) United States Patent
Christini et al.

(10) Patent No.: US 7,487,854 B2
(45) Date of Patent: Feb. 10, 2009

(54) TWO-WHEEL DRIVE TWO-WHEELED VEHICLE

(75) Inventors: Steven J. Christini, Philadelphia, PA (US); Michael J. Dunn, Charlottesville, VA (US); Louis J. Allora, Basking Ridge, NJ (US); Robert Pigeon, East Norriton, PA (US); Jeremy T. Shook, Ballston Spa, NY (US)

(73) Assignee: Christini Technologies, Inc., Philadelphia, PA (US)

( * ) Notice: Subject to any disclaimer, the term of this patent is extended or adjusted under 35 U.S.C. 154(b) by 0 days.

(21) Appl. No.: 11/968,820

(22) Filed: Jan. 3, 2008

(65) Prior Publication Data

US 2008/0100027 A1 May 1, 2008

Related U.S. Application Data

(60) Continuation of application No. 11/002,981, filed on Dec. 3, 2004, now Pat. No. 7,328,766, which is a continuation-in-part of application No. 10/187,984, filed on Jul. 3, 2002, now abandoned, which is a division of application No. 09/631,982, filed on Aug. 3, 2000, now Pat. No. 6,439,592, which is a continuation-in-part of application No. 09/372,160, filed on Aug. 11, 1999, now Pat. No. 6,182,991, which is a continuation-in-part of application No. 09/171,742, filed as application No. PCT/US97/06181 on Apr. 25, 1997, now Pat. No. 6,161,854.

(60) Provisional application No. 60/096,264, filed on Aug. 12, 1998, provisional application No. 60/016,232, filed on Apr. 26, 1996.

(51) Int. Cl.
*B62D 61/02* (2006.01)
*B62K 11/00* (2006.01)
*B62M 11/00* (2006.01)

(52) U.S. Cl. ........................ 180/224; 180/223; 180/226; 280/260

(58) Field of Classification Search ................. 180/219, 180/223, 224, 226, 259, 260; 74/551.1–551.4, 74/594.1, 594.2, 665 GC, 665 H, 380, 385, 74/386; 464/167
See application file for complete search history.

(56) References Cited

U.S. PATENT DOCUMENTS 451,811 A 5/1891 Crumb (Continued)

FOREIGN PATENT DOCUMENTS

DE 192323 3/1907
EP 0 445 841 B1 9/1911

(Continued)

OTHER PUBLICATIONS

"First Ride: The 2000 BMW R1150 GS" [online] [retrieved on Jul. 21, 1999] Retrieved from the Internet, URL: http://www.motorcycle.com/mo/mcbmw/00r1150gs.html, pp. 1-5.

*Primary Examiner*—Paul N Dickson
*Assistant Examiner*—Marc A Scharich
(74) *Attorney, Agent, or Firm*—Cooley Godward Kronish LLP

(57) ABSTRACT

A two-wheel drive motorcycle having a drive train that supplies power to the front wheel and includes a series of rigid shafts or other internalized drive systems. The front wheel drive consists of components located on the axis of steering within the head tube and positioned symmetrically in a counterbalancing fashion within the front fork in order to counteract the torque reactions from the rotating front wheel drive while providing a full range of steering. The front wheel drive lengthens and shortens in parallel with the shock-absorbing front fork. An engagement clutch, a one-way hub, and torque limiting clutch operatively engaged with the front wheel drive are also disclosed.

22 Claims, 12 Drawing Sheets

U.S. PATENT DOCUMENTS

| | | |
|---|---|---|
| 1,107,990 A | 8/1914 | Pamer |
| 1,139,622 A | 5/1915 | Yordi |
| 2,358,035 A | 9/1944 | Schwinn |
| 2,859,979 A | 11/1958 | Himes |
| 3,024,860 A | 3/1962 | Nicolai |
| 3,118,514 A | 5/1962 | Bowman |
| 3,268,025 A | 8/1966 | Fehn |
| 3,360,200 A | 12/1967 | Purtell |
| 3,785,676 A | 1/1974 | Klein, Jr. |
| 3,797,276 A | 3/1974 | Orain |
| 3,936,076 A | 2/1976 | Probst |
| 3,955,828 A | 5/1976 | Boudreau |
| 4,029,332 A | 6/1977 | Davis |
| 4,047,451 A | 9/1977 | Ackerman |
| 4,093,262 A | 6/1978 | Koyama et al. |
| 4,397,369 A | 8/1983 | Read |
| 4,437,355 A | 3/1984 | Bordat |
| 4,479,660 A | 10/1984 | Pattison |
| 4,611,684 A | 9/1986 | Geschwender |
| 4,664,215 A | 5/1987 | Suzuki et al. |
| 4,685,692 A | 8/1987 | Fullilove et al. |
| 4,702,340 A | 10/1987 | Hamilton |
| 4,704,920 A | 11/1987 | Kurata |
| 4,773,662 A | 9/1988 | Phillips |
| 4,895,385 A | 1/1990 | Becoat |
| 4,900,046 A | 2/1990 | Aranceta-Angoitia |
| 5,004,258 A | 4/1991 | Becoat |
| 5,014,808 A | 5/1991 | Savard et al. |
| 5,042,608 A | 8/1991 | Horiike et al. |
| 5,050,699 A | 9/1991 | Savard |
| 5,052,705 A | 10/1991 | Ringle |
| 5,054,572 A | 10/1991 | Parker |
| 5,101,946 A | 4/1992 | Lederman |
| 5,113,964 A | 5/1992 | Yamauchi |
| 5,116,070 A | 5/1992 | Becoat |
| 5,136,892 A | 8/1992 | Ochs |
| 5,158,314 A | 10/1992 | Farras Pinos |
| 5,183,139 A | 2/1993 | Malacha |
| 5,184,838 A | 2/1993 | Becoat |
| 5,188,205 A | 2/1993 | Karp et al. |
| 5,224,725 A | 7/1993 | Erlston |
| 5,253,889 A | 10/1993 | Kaminski |
| 5,320,374 A | 6/1994 | Farris et al. |
| 5,324,057 A | 6/1994 | Chartrand |
| 5,332,244 A | 7/1994 | Turner et al. |
| 5,390,773 A | 2/1995 | Proia |
| 5,390,946 A | 2/1995 | Spicer |
| 5,397,142 A | 3/1995 | Schwarzenbacher |
| 5,417,446 A | 5/1995 | Pileggi |
| 5,485,905 A | 1/1996 | Rader, III |
| 5,522,612 A | 6/1996 | Considine |
| 5,542,689 A | 8/1996 | Chalfant |
| 5,618,293 A | 4/1997 | Sample et al. |
| 5,662,197 A | 9/1997 | Tabe |
| 5,873,428 A | 2/1999 | Ohshita et al. |
| 5,894,903 A | 4/1999 | Hieble |
| 6,161,854 A | 12/2000 | Christini et al. |
| 6,161,855 A | 12/2000 | Christini et al. |
| 6,182,991 B1 | 2/2001 | Christini et al. |
| 6,439,592 B1 | 8/2002 | Christini et al. |
| 6,505,699 B1 | 1/2003 | Christini et al. |
| 7,328,766 B2 | 2/2008 | Christini et al. |

FOREIGN PATENT DOCUMENTS

| | | |
|---|---|---|
| EP | 0 564 523 B1 | 10/1993 |
| EP | 0 697 329 A1 | 2/1996 |
| EP | 0 779 205 A2 | 6/1997 |
| FR | 1141328 | 8/1957 |
| FR | 560717 | 7/1993 |
| GB | 360735 | 11/1931 |
| GB | 1284821 | 8/1972 |
| JP | 3213755 | 9/1991 |
| JP | 9156570 | 6/1997 |
| WO | WO 93/09992 | 5/1993 |

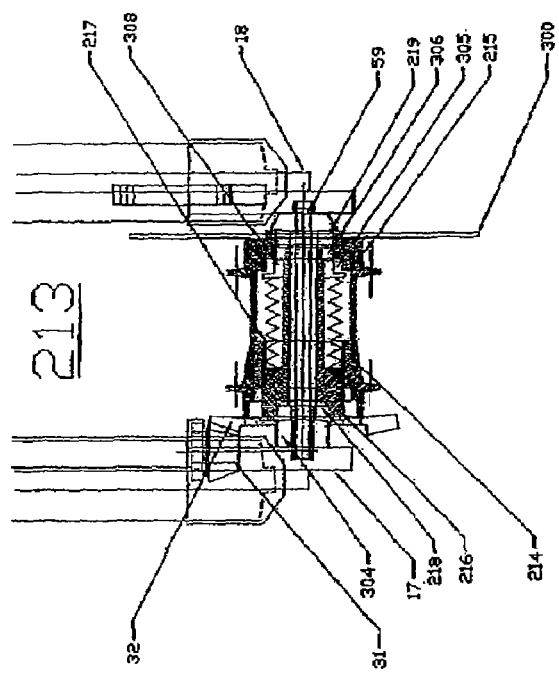
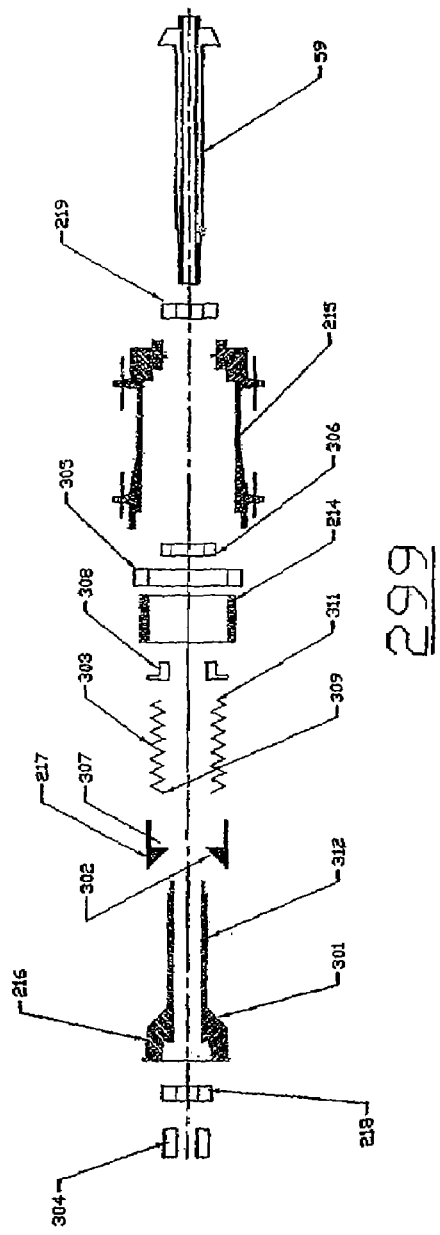
Fig. 7
Fig. 8

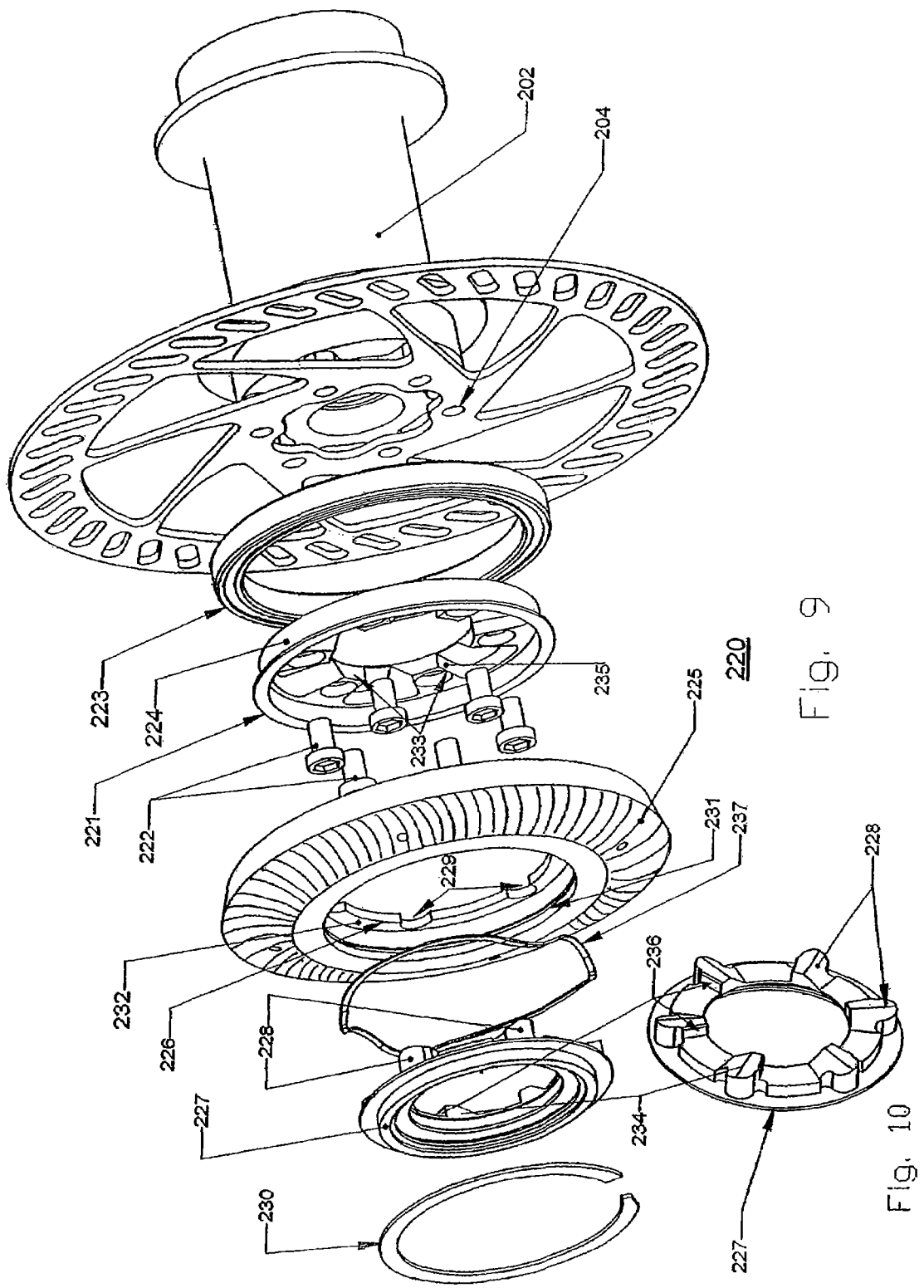

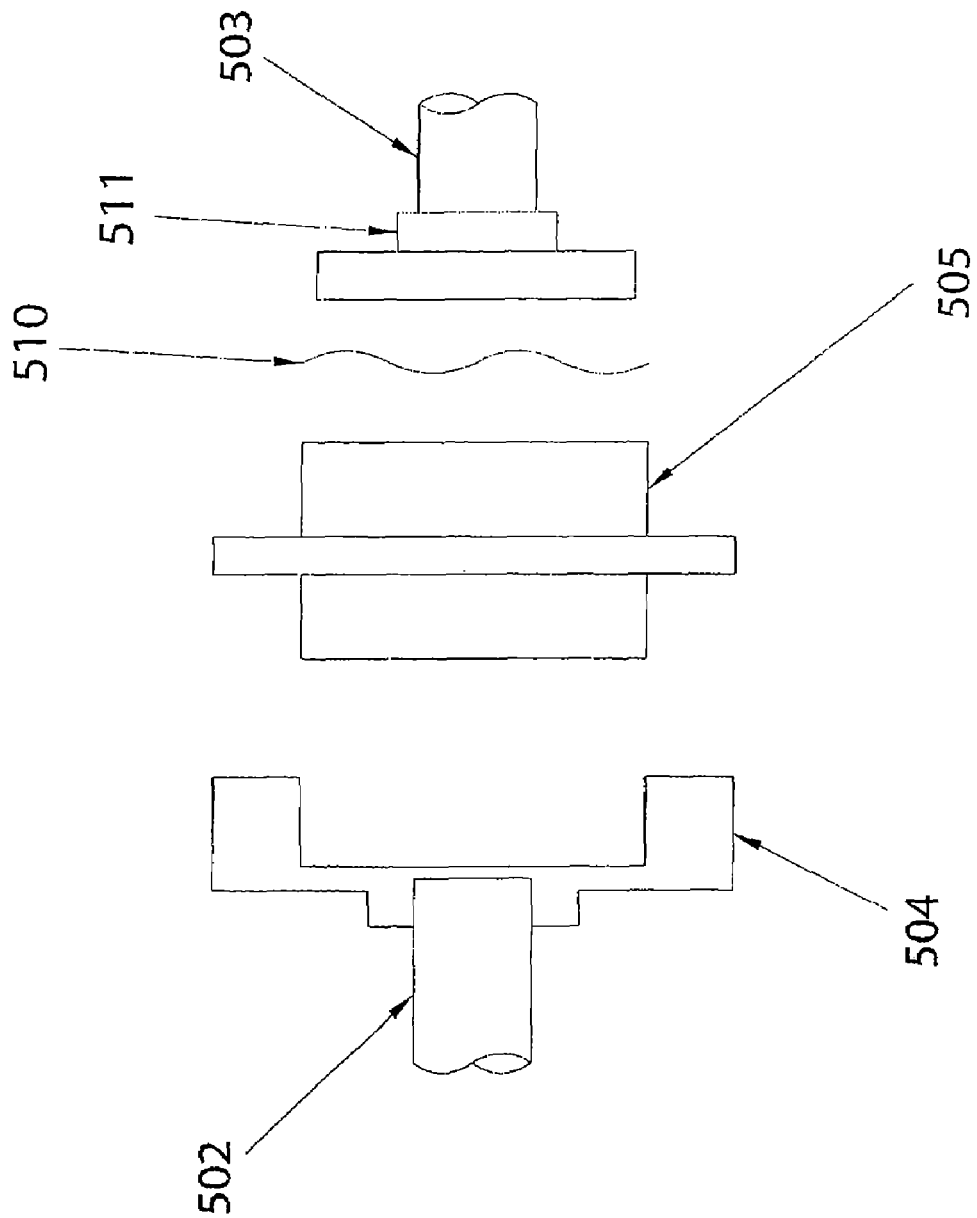

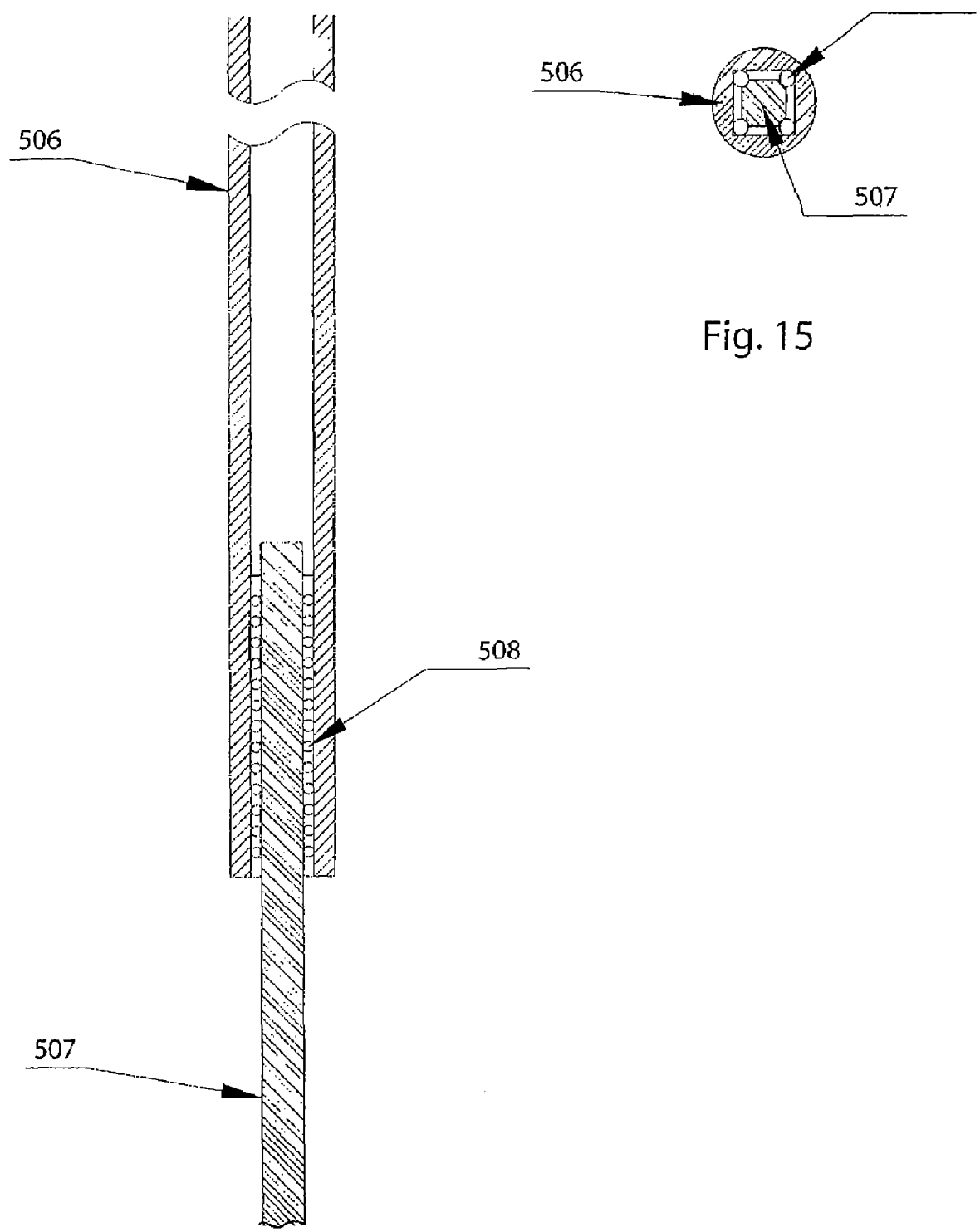

TWO-WHEEL DRIVE TWO-WHEELED VEHICLE

CROSS REFERENCE TO RELATED APPLICATIONS

This application is a Continuation of U.S. application Ser. No. 11/002,981, filed Dec. 3, 2004, now U.S. Pat. No. 7,328,766 entitled "Two-Wheel Drive Two-Wheeled Vehicle," which is a Continuation-in-Part of U.S. application Ser. No. 10/187,984, filed Jul. 3, 2002, now abandoned entitled "Two-Wheel Drive Two-Wheeled Vehicle," which is a Divisional of U.S. application Ser. No. 09/631,982, filed Aug. 3, 2000, entitled "Two-Wheel Drive Two-Wheeled Vehicle," now U.S. Pat. No. 6,439,592, which is a continuation-in-part of U.S. application Ser. No. 09/372,160, filed Aug. 11, 1999, now U.S. Pat. No. 6,182,991, which is a continuation-in-part of application Ser. No. 09/171,742, filed Oct. 23, 1998, now U.S. Pat. No. 6,161,854, which is a 371 of PCT/US97/06181, filed Apr. 25, 1997 and relates to and claims the benefit of U.S. Provisional Application Ser. No. 60/016,232, which was filed on Apr. 26, 1996. In addition, application Ser. No. 09/372,160 relates to and claims the benefit of U.S. Provisional Application Ser. No. 60/096,264, filed Aug. 12, 1998. Each of the above referenced applications are incorporated herein by reference in their entirety.

BACKGROUND

1. Field of the Invention

The present invention relates to a two-wheel drive two-wheeled vehicle, and more particularly a two-wheel drive motorcycle having a rear wheel driven by a chain or shaft mechanism and the front wheel driven by a series of shafts and gears transferring power to the front wheel from either the motorcycle transmission or the driven rear wheel. Moreover, the two-wheel drive motorcycle disclosed herein is configured so that the front wheel drive components counterbalance all steering system torque reactions and moments of inertia through placement of numerous components located on the axis of steering and symmetrically within the motorcycle front fork. The novel configuration enable the rider to maintain control of the two-wheel drive motorcycle during the high-speed, high-power rotation of the engine-powered front wheel drive.

2. Description of Related Art

As motorcycle and off-road motocross riding has gained broader appeal, the demands that riders place on their vehicles have increased dramatically. Conventional motorcycles are powered through a chain or shaft linking the engine to the rear wheel. However, motocross and motorcycle riders are now facing riding conditions and obstacles where having only rear wheel drive can lead to vehicle damage, loss of control and an unstable front wheel during cornering and off-road riding in general. For professional riders, precious race time is lost avoiding obstacles or losing traction in loose rocks, sand, dirt, mud, or ice. Traction and climbing ability are severely limited in extreme mountain conditions by only having the rear wheel provide power. Accordingly, there is a need in the industry for a two-wheel drive motorcycle that efficiently and safely transfers power from the motor through the transmission to the front wheel, that provides the rider with increased ability to safely negotiate rough terrain, and that does not detract from the aesthetic qualities, appearance or function of the motorcycle itself.

While both two-wheel drive motorcycles and two-wheel drive bicycles have been attempted in the past, the present invention relating to the two-wheel drive motorcycle offers significant technical and functional innovations previously not disclosed or anticipated. The present invention features symmetrically positioned and counterbalanced front wheel drive components relative to the axis of steering and motorcycle centerline that eliminate or minimize the torque reactions that would otherwise adversely affect motorcycle control when the front wheel is driven. Additionally, the present invention illustrates a front wheel drive for a two-wheel drive motorcycle that is completely enclosed within the motorcycle frame, head tube, and front fork in a way that reduces danger to the rider from moving parts and ensures that the motorcycle steering is unencumbered.

By comparison, previous attempts at constructing a two-wheel drive motorcycle have utilized hydraulic, hydrostatic, and variations of belt, shaft or chain drives that have numerous exposed parts. Importantly, none of the previous attempts at constructing a two-wheel drive motorcycle would result in a functional two-wheel drive motorcycle. Primarily, none of the prior attempts have taken into account that a motorcycle drive system based upon rigid shafts can spin at several thousand revolutions per minute producing torque reactions along the front fork from the spinning front wheel drive system that would result in an uncontrollable pull on the front wheel. Furthermore, previous attempts have failed to provide a motorcycle with a full rage of steering.

U.S. Pat. No. 4,702,340 shows a motorcycle with a front wheel driven by a chain supported by the motorcycle fork and handlebars powering a large chain drive gear on the front wheel. The patent is assigned to Rokon International who previously produced a similar two-wheeled vehicle capable of only low-speed rough terrain maneuvering. As shown, the front wheel drive chain would severely limit the ability to manufacture a motorcycle capable or any high speed maneuvering.

U.S. Pat. Nos. 5,014,808, 5,050,699, 5,054,572, and 5,113,964 show variations of motorcycles with a front wheel powered by a series of belts, chains, gears, or sprockets from the motor to the front fork and then to the front wheel along one side of the fork. While a motorcycle does not need the same broad range of steering that is necessary for a bicycle, the presence of a bulky drive chain on one side of the motorcycle would cause problems with both steering as well as unwanted torque reactions that would make the motorcycle potentially uncontrollable at high speeds. The exposed front wheel drive chains also pose a potential hazard to the rider.

U.S. Pat. Nos. 5,873,428 and 5,894,903, JP9156570A2, EP 0 779 205 A2, and EP 0 779 205 A3 show motorcycles with a front wheel driven by hydraulic motors or hydrostatic pressure from the engine to the front wheel. A motorcycle with a front wheel driven by a hydraulic drive system would have significantly less efficient power transfer than a rigid-shaft drive system.

GB Patent Number 1,284,821 shows a motorcycle with a front wheel driven by an extremely complex shaft and gear drive system. The motorcycle includes a radically-redesigned front end without a head tube, very large gears extending well in front of the axis of steering, and a front drive system located within one fork leg. The adverse torque reactions resulting from the unbalanced front wheel drive system and high-speed rotation of the front wheel drive would likely result in a motorcycle that is uncontrollable. This configuration of the front wheel drive would also prevent a full range of steering.

WO 93/09992 (PCT/FR92/01084) discloses a front wheel drive for a two-wheel drive motorcycle that is not counterbalanced on the axis of steering and is located in a significantly enlarged front end lacking a head tube. Such a front end would interfere with the full steering range of the motorcycle during sharp turns and make the motorcycle impossible to ride on complex terrain and potentially pose a safety risk. Additionally, while the invention discloses a drive system within both fork legs, the invention fails to disclose a counterbalanced drive system as several gears are vertically offset from each other. Further, as illustrated, the dimensions of a standard motorcycle would require that the drive gears be several inches in diameter and both the shafts and gears are inadequately supported for the enormous torque that would be transferred through such a drive system design. In short, the disclosed two wheel drive vehicle fails to adequately address the problem of torque counter balancing or provide a full range of steering.

The attempts at constructing two-wheel drive two-wheeled vehicles also include several two-wheel drive bicycle designs. Generally, two-wheel drive bicycles fall into two categories: 1) permanent designs involving drive trains attached to the frame, and 2) retrofit kits which convert existing bicycles to two-wheel drive. The main drawbacks to these systems are: 1) a modification to the standard bicycle in the form of a kit is expensive when considered as an addition to a bicycle purchase, 2) the low strength flexible shaft limits the allowable loading on the system, 3) the retro-fit kit requires considerable skill to attach and cannot be designed to optimally work with every frame design, and 4) the drive mechanisms are often large and openly exposed on the outside of the frame potentially creating additional hazards for the rider and detracting from the overall appearance of the bicycle. In short, none of the two-wheel drive bicycles discussed below could be successfully modified or adapted to produce a functional two-wheel drive motorcycle. U.S. Pat. No. 4,773,662 shows a bicycle with a front wheel driven by a chain connected to a handlebar mounted hand pedaling system. The bicycle uses arm power to drive the front wheels and is adaptable to a conventional bicycle frame.

U.S. Pat. No. 5,542,689 shows a front wheel drive system for a bicycle which can be installed on a bicycle to drive the front wheel by rocking the handlebars back and forth. As with U.S. Pat. No. 4,773,662 mentioned previously, this bicycle attempts to harness the energy of the rider's arms as an additional power source for driving the bicycle. However, a drive mechanism requiring the use of the riders arms for more than steering, balance and control of the vehicle would likely create safety problems and interfere with the bicycle's operation for both professional and recreational mountain bikers.

U.S. Pat. No. 5,052,705 describes a bicycle with power distribution from the rear wheel to the front wheel via a caliper and cable drive system. The drive system is activated by a caliper clamped on the rear wheel connected by a cable to a caliper on the front wheel. Inefficient power transfer to the front wheel due to slippage as well as torque loss in the cable would likely be a problem with this system.

U.S. Pat. No. 5,224,725 describes one permanent system that has been developed utilizing a series of chains and sprockets. This design utilizes many moving parts that would make the bicycle very awkward and difficult to maintain. The exposed chain that runs along the top tube could be hazardous to the rider and the front chain also would interfere with steering.

U.S. Pat. No. 5,324,057 describes a bicycle driven with a chain meshed with both the front and rear sprockets through a plurality of gears, pulleys and spring systems to power the front wheel.

U.S. Pat. Nos. 5,332,244, 5,253,889, 5,158,314, 5,116,070, and 4,895,385 disclose two-wheel drive bicycles including a front wheel driven by flexible cables or flexible cables in combination with chains. Other systems, such as the system produced by Turner Drive Systems of Rogers, Ark., target the market for a drive system which can be retrofit to any standard bicycle frame with modifications primarily to the gearing and chain attachments necessary to drive the front wheel. As discussed above, a cable-driven front wheel results in inefficient power transfer to the front wheel due to cable wind.

U.S. Pat. No. 5,332,244 discloses chain-sprocket arrangements, along with a flexible shaft to transmit some of the power from a rear gearbox to the front wheel. The retrofit system utilizes the inner most sprocket for the drive system, however the rider can use the other sprockets to shift gears normally. Deformation of the flexible cable, and corresponding loss of efficient power transfer from the rear wheel to the front wheel is a drawback of each of these systems when compared to the rigid shaft drive of the present invention.

U.S. Pat. No. 5,158,314 uses a complex mechanical system to power the front wheel from the powered rear wheel. A first traction chain coupled to the rear wheel and attached to the frame is connected to a series of rigid and flexible shafts which attach to a second traction chain which is mounted above and powers the front wheel. U.S. Pat. No. 4,029,332 and U.S. Pat. No. 4,474,660 also describe two-wheel drive bicycles with complex chain or belt drive and pulley systems.

Bicycle hubs utilizing roller clutch bearings are described in U.S. Pat. Nos. 5,485,905 and 5,662,197. However, neither application discloses the use of the roller clutch hub to provide power transmission advantages for the front wheel drive of a two-wheel drive bicycle nor does either utilize more than a single roller clutch within the hub for added strength and durability of the hub shell.

SUMMARY OF THE INVENTION

The present invention is a two-wheel drive motorcycle, otherwise known as an all wheel drive motorcycle or a motorcycle powered by both the rear and the front wheels simultaneously. The two-wheel drive motorcycle disclosed herein may include a shock-absorbing front fork or rear suspension system. Additionally, the front wheel drive of the two-wheel drive motorcycle may be adapted to a number of motorcycle frame configurations including motocross, enduro, road, cruising and touring motorcycles.

The disclosed embodiments of the two-wheel drive motorcycle are novel and inventive over all prior two-wheel drive motorcycles and two-wheel drive bicycle attempts. The two-wheel drive motorcycle disclosed herein is configured so that the front wheel drive components counterbalance all steering system torque reactions and moments of inertia. Furthermore, the two-wheel drive motorcycle of the present invention includes numerous components located on the axis of steering within the head tube. The two-wheel drive motorcycle disclosed herein features paired components, gears, and drive shafts positioned symmetrically relative to the centerline and axis of steering (in a mirror-like fashion) within the motorcycle lower crown and front fork. The two-wheel drive motorcycle of the present invention has a full-range of uninterrupted steering enabling the rider to maintain control of the steering of the two-wheel drive motorcycle during the high-speed rotation of the engine-powered front wheel drive.

The two-wheel drive motorcycle of the present invention includes a head tube that encloses a front wheel drive and includes a separated neck tube that supports the front fork and steering mechanism on bearings within the head tube to enable rotation of the steering mechanism around the front wheel drive gears.

The two-wheel drive motorcycle of the present invention includes a rigid shaft front wheel drive supported by bearings and, therefore, does not experience the inefficient power transfer to the front wheel of other previously-disclosed front wheel drive systems.

The two-wheel drive motorcycle disclosed herein further includes a rigid front wheel drive that powers the front and rear wheels instantaneously, without power loss, and in a ratio which enables safe and effective operation of the motorcycle and provides instantaneous transfer of power from the motor to the front wheel.

The two-wheel drive motorcycle of the present invention further includes a motorcycle frame and front fork that substantially enclose the front wheel drive within the head tube and fork of the motorcycle providing effective power transfer to the front wheel with no interference of rider motion, with normal braking and steering radius, and with minimal rider danger from moving parts.

The two-wheel drive motorcycle disclosed herein further includes a front wheel drive that may be adapted to a variety of common motorcycle frame configurations and designs including motocross, enduro, road and touring motorcycles.

The two-wheel drive motorcycle of the present invention further optionally includes an engagement clutch in the front wheel drive that allows the rider the option to choose between rear-wheel-only drive, two-wheel drive, or front-wheel-only drive operation when conditions warrant.

The front wheel drive technology of the present invention may optionally be incorporated into a shock-absorbing front fork and rear suspension system of a motorcycle to provide the rider with a smoother ride. Sliding spline shafts supported by ball or needle bearings allow for smooth operation of the front fork with minimal friction from the sliding shafts as the front for expands and compresses.

The two-wheel drive motorcycle disclosed herein also optionally includes a free wheeling front hub that utilizes a roller clutch bearing, or any other type of ratcheting clutch, or sprag clutch bearing. Additionally, in one alternative embodiment, the free wheeling hub includes a torque-limiting clutch to prevent failure of the front wheel drive under extreme torque loads.

The two-wheel drive motorcycle disclosed herein further proposes alternative drive systems that can be incorporated into the frame, head tube and front fork of the motorcycle or within tubing attached to the frame to power the front wheel either from the rear wheel or directly from the engine and transmission in the center of the motorcycle. One such alternative front wheel drive features a ball-bearing drive system.

The two-wheel drive motorcycle disclosed herein further proposes the use of a torque limiting clutch that can be incorporated into the front wheel drive system to relieve excess torque transmitted through the drive system from the motor.

The present invention, as specifically described in the first and second embodiments, has several novel and innovative features when compared to all previously attempted two-wheel drive motorcycles and bicycles, including the two-wheel drive bicycle disclosed in related applications. First, the two-wheel drive motorcycle disclosed herein is configured so that the front wheel drive components counterbalance steering system torque reactions and moments of inertia. Second, the two-wheel drive motorcycle disclosed herein includes numerous components located on the axis of steering within the head tube to minimize or negate any torque reactions that could negatively affect steering and control as power is transferred to the front wheel.

The two-wheel drive motorcycle disclosed herein features paired or counterbalancing and symmetrical components, gears, and drive shafts positioned relative to the axis of steering and centerline within the motorcycle lower crown and front fork to minimize or negate torque reactions that could negatively affect steering and control as power is transferred to the front wheel. The two-wheel drive motorcycle configured with symmetrical drive shafts and components in the front fork and head tube as disclosed herein facilitates a full-range of uninterrupted steering while enabling the rider to maintain control during the high-speed rotation of the engine-powered front wheel drive.

Unlike the previously disclosed two-wheel drive bicycles and motorcycles, this invention discloses a front wheel drive for a two-wheel drive motorcycle that includes components and at least two front wheel drive gears located on the steering axis within the motorcycle head tube. Additionally, the two-wheel drive motorcycle disclosed herein optionally incorporates the front wheel drive within the head tube and a neck tube that is severed, or features a cut-away section. However, any front wheel drive that contains components along the axis of steering either within the head tube or in the vicinity of where a typical head tube would be located between the fork members is contemplated by the present invention.

Additionally, it is desirable to place the rotating front wheel drive components along the steering axis above the front wheel so that there is limited tendency to produce rotational torque to the front wheel during normal and high-speed operation. Moving the front wheel drive components even a small amount off the steering axis could result in torque reactions that would make steering difficult. Furthermore, placing the drive components symmetrically along each side of the front fork, thus, rotating in opposite directions, provides a counterbalancing effect to offset the torque reactions. The front wheel drive configuration of the present invention provides stability to the motorcycle and enables steering and operation at all speeds.

Additional features of the two-wheel drive motorcycle disclosed herein include a front wheel drive that transfers power to the front wheel from gears originating within the motorcycle's transmission or from gears located at the rear wheel. The front wheel drive may include rigid shafts and meshing gears or a number of other drive components and assemblies, including ball bearing drives, that are internalized within the motorcycle frame and that minimize power loss when powering the front wheel without limitation of the steering range. A two-wheel drive motorcycle in accordance with the present invention provides a rider with increased safety and the ability to significantly increase speed during navigation through dangerous stretches of terrain.

The two-wheel drive motorcycle of the present invention further uses a series of rigid shafts as the main power transfer means to the front wheel. Rigid shafts have the advantage of virtually instantaneous power transfer, whereas flexible shafts usually have from 10 to 20 degrees of rotational displacement when subject to a torque which would lead to a spongy feeling. Similarly, hydraulic drives are not as efficient as a rigid drive system in transferring power through the system. Additionally, a rigid shaft drive is supported by bearings which results in very low friction in the front wheel drive system.

The front wheel drive system of the two-wheel drive motorcycle of the present invention is substantially enclosed either within the frame or within tubing attached to the frame, within the head and neck tubes, and/or within the front fork crown and fork tubes to maintain the front wheel drive in a fixed position thereby minimizing or eliminating slippage and, as importantly, enclosing the moving parts to minimize danger to the rider. Enclosing the front wheel drive system will also maintain the general aesthetic appearance of the motorcycle. Prior two-wheel drive motorcycles and bicycles featured numerous external drive chains to the front wheel that significantly detracted from the appearance. Enclosing the front wheel drive within the head and neck tubes and modifying the neck tube to accommodate the front wheel drive while turning enables the motorcycle steering mechanism to turn smoothly without interference with the front wheel drive system. Finally, enclosing the front wheel drive facilitates adaptation to numerous common motorcycle frame designs including motocross, road, and touring.

The front wheel hub of the two-wheel drive motorcycle of the present invention is designed to attach meshing gears. More specifically, the power is transferred to the front wheel from the motorcycle's transmission or rear wheel through a rigid drive system that includes gears located on the lower end of the symmetrically-positioned drive shafts located within each fork tube and that mesh with gears mounted on either side of the front wheel hub. The gears may feature either straight or helical (spiral) gear teeth although helical gears are preferred for strength, smoothness and quieter power transfer.

The head and neck tube or the steering axis region of the motorcycle of the present invention are modified to accommodate at least three meshing gears with one being attached to the front end of the main drive shaft that originates at the motorcycle's transmission or from the rear wheel and the other two being attached to drive shafts which attach to gears located within the lower fork crown. The meshing gears are supported on bearings within the head tube to keep the bearings and front wheel drive components aligned along the steering axis. The disclosed configuration further provides an optimum fork angle relative to the ground for steering responsiveness and control without restricting steering of the two-wheel drive motorcycle. The head and neck tubes, which may be either standard sized or enlarged, are modified so that the neck tube will not interfere with the meshing front wheel drive gears while the motorcycle is being steered.

The neck tube of the two-wheel drive motorcycle of the present invention is preferably cut away in the center to accommodate the meshing gears that are supported on bearings within the head tube to keep the bearings and front wheel drive components aligned along the steering axis. More specifically, the neck tube is cut away or severed to create two separate sections of neck tube above and below the rotating front wheel drive gears and components within the head tube. The neck tube sections are then supported by needle bearings within the head tube and by clamping power of the fork crowns above and below the head tube. In that way, the head tube acts as a gear casing located between the upper ends of the fork members and below the handlebars. It is important that the casing be positioned so as not to interfere with rotation of the handlebars and fork members.

The front wheel drive shafts descending within the front fork posts of the two-wheel drive motorcycle of the present invention are configured to enable both free motion in the steering of the motorcycle and free rotation of the front tire as well as to create no interference with the disk brake system. In the first and second embodiments disclosed herein, two series of symmetrical meshing gears within the fork crown transfer power outward from the axis of steering to the drive shafts located within the fork members on each side of the front wheel. Alternatively, a universal joint system could be utilized.

The front wheel drive system of the two-wheel drive motorcycle of the present invention also may include an adjustable component to enable the compression of the front fork and may also include an adjustable component to accommodate movement of the rear suspension if the front wheel drive originates at the rear wheel. As in the first embodiment, sliding shafts within the fork tubes could be utilized to accommodate the expansion and contraction of the shock-absorbing front fork. As in the seventh embodiment, a ball spline system may provide smooth expansion and contraction with limited friction as the sliding shafts expand and contract. Since the front wheel drive system is under very high torque loads during operation, ball bearing spline shafts or needle bearing square shafts may be utilized to minimize this friction. Alternatively, a telescoping universal joint could be utilized to adjust for lengthening and shortening of the front fork. Also, numerous alternate drive gear combinations can be used instead of the miter gears for transmitting power from the main drive shaft to the front drive shaft system.

The front wheel drive system of the present invention optionally includes an engagement clutch located either within the motorcycle's transmission or at the rear wheel to enable the rider to optionally shift the two-wheel drive motorcycle from rear-wheel-only drive to two-wheel drive to, potentially, front wheel only drive if the clutch is located within the transmission. The engagement clutch for the front wheel drive could be either a hydrostatic or hydraulic clutch as is well know in the industry or a cable-activated mechanical clutch featuring engaging dog tooth plates as shown in the fourth embodiment of the present invention.

A free wheeling or one-way front hub utilizing at least one roller clutch is also disclosed. The roller clutch has the advantage of being virtually instantaneous in engaging as the one-way hub reverses from its free-wheeling direction to the engaged direction. The free wheeling hub disclosed herein may also feature a torque limiting clutch to prevent front wheel drive failure upon the transfer of severe torque loads through the drive system.

The front wheel drive system may also include a torque limiting clutch located along the shaft of the front wheel drive system between the motor and the head tube that provides for a fail-safe release of excess torque. The torque limiting clutch may include clutch plates held together by pressure that slip relative to each other when pre-determined torque levels are exceeded. The plates of the torque limiting clutch would then re-establish rigid contact with respect to each other to provide for continued power transfer to the front wheel.

Thus, according to the broad aspects of the invention, the two-wheel drive motorcycle of the present invention may include:

(a) a rigid front wheel drive that transmits power from the engine and transmission or from the rear wheel to the front wheel, through a series of rigid drive shafts including a main drive shaft and a front drive shaft and a series of meshing gears or, alternatively, through other front wheel drive configurations such as a ball bearing drive system that would provide similar efficient and instantaneous power transfer to the front wheel;

(b) a frame, head tube, steering tube, and front fork constructed of tubing, including sections which enclose the front wheel drive system;

(c) a front wheel drive with components that i) are located on or very near the steering axis and preferably, within the head tube and neck tube that have been modified to accommodate the front wheel drive as it rotates, ii) are designed to minimize torque reactions due to the rotating shafts, and iii) are designed to accommodate a full range of steering;

(d) a pair of front drive shafts positioned symmetrically relative to the centerline and a pair of front drive shafts located on opposite sides of the front wheel to counterbalance rotational torque reactions from the front wheel drive and also configured to enable both free motion in the steering of the motorcycle and free rotation of the front wheel without interfering with braking or tire rotation;

(e) a front wheel drive with an adjustable component to accommodate the movement of a shock-absorbing front fork or a rear suspension to ensure a smoother ride;

(f) an engagement clutch to provide the rider the option of shifting the motorcycle from two-wheel drive to rear wheel-only drive;

(g) a one-way hub in the front wheel resulting in minimal backlash to enable virtually instantaneous power transfer to the front wheel;

(h) a torque-limiting clutch to enable release of extreme torque loads within the front wheel drive prior to failure.

In summary, in the present invention, the power is transferred from the engine of the two-wheel drive motorcycle through a rigid front wheel drive that includes a series of meshing gears. The frame of the motorcycle is designed to contain the front wheel drive system that transmits power to the front wheel.

The power is transmitted from the engine to a front wheel drive shaft that originates either within the transmission or from the rear wheel. A drive gear at the front end of the main drive shaft meshes with at least one additional drive gear that is located at or very near the axis of steering and along the centerline within the head and steering tube. Additional front wheel drive components along the axis of steering cancel or minimize the effect of torque generated from the spinning front wheel drive on the rider's ability to control and steer the two-wheel drive motorcycle. Additionally, the neck and head tube are standard-sized or, alternatively, enlarged in comparison to a standard bicycle to allow for full steering capabilities while transferring power to the front wheel. The paired rigid front wheel drive then descends symmetrically along both sides of the front wheel through either a series of meshing gears that may be located within the fork crown, or alternatively with a universal joint to attach to the front wheel drive shafts. Those skilled in the art will recognize other methods for constructing a front drive shaft system that does not interfere with the front wheel, and the embodiments disclosed herein are not to be construed as limiting.

The front drive shafts transmit power through shafts along both sides of the front wheel within the front fork through the meshing of drive gears attached to the lower end of each front shaft and gears mounted circumferentially on each end of the front wheel hub. The front wheel hub may be a one-way hub that catches in one direction but freewheels in the other direction to enable the rider to coast freely. The front wheel hub could utilize at least one roller clutch to enable one-way freewheeling. Roller clutches have the added advantage of silent operation and nearly instantaneous engagement. While virtually all ratcheting hubs feature some degree of backlash as the ratchet engages, the roller clutch engages virtually as soon as the rotational direction of the hub changes. This feature is important for the front wheel drive so that any power transferred through the front wheel drive will result in instantaneous front wheel traction whereas the use of a ratcheting front hub would result in some degree of rotational backlash in the front hub before the front wheel would engage and become powered by the front wheel drive. Additionally, the use of more than one roller clutch within the front hub would provide additional strength in the system by spreading the torque forces over a larger surface within the hub shell.

As disclosed, the front wheel drive system of the present invention may be completely incorporated into a shock-absorbing front fork of the two-wheel drive motorcycle. The sliding front drive shafts slide within the meshing gears or, alternatively, an inner sliding shaft and an outer sliding shaft within the fork member slide relative to each other with the change in length of the shock-absorbing front fork. Alternative front fork designs include the use of expanding ball spline universal joints in the place of the meshing gears. The complete integration of the front wheel drive within the front fork crown and fork members is important for both aesthetic appearances of the motorcycle as well as minimizing danger to the rider from exposed rotating parts. Additionally, the enclosure of the front wheel drive within the fork tubes keeps the front wheel drive in a fixed position to increase efficiency of power transfer. Those skilled in the art will recognize other methods for constructing and mounting a shock-absorbing front fork onto the motorcycle's frame in a manner which does not interfere with steering or rotation of the front wheel while enabling the front drive shaft system to expand and to contract with the expansion and contraction of the shock-absorbing front fork.

One embodiment of the two-wheel drive motorcycle of the present invention features power transfer directly from the engine and transmission to the front wheel through a rigid drive system. The rigid drive system is internal to the motorcycle frame or within tubing attached to the motorcycle frame and within the head tube and steering tube to enable a full range of steering and instantaneous power transfer to the front wheel. Furthermore, in contrast to two-wheel drive bicycles previously disclosed, front wheel drive components located symmetrically relative to the axis of steering and centerline are important for controlling torque reactions while steering or operating the two-wheel drive motorcycle.

Similar to a two-wheel drive bicycle, the two-wheel drive motorcycle has increased traction and mobility of the front wheel, especially during uphill climbs and downhill cornering on loose or slippery material. A shock-absorbing front fork and rear suspension ensures a smoother ride and greater contact of the front wheel with the terrain for all-around improved rider experience. The invention discloses a method of manufacturing a functional two-wheel drive two-wheeled vehicle with all the disclosed embodiments.

BRIEF DESCRIPTION OF THE DRAWINGS

FIG. 7 is a front view of a one-way front hub with a roller clutch for a two-wheel drive motorcycle in accordance with the present invention.

FIG. 8 is an exploded view of a one-way front hub with a front roller clutch and including a torque-limiting clutch in accordance with the present invention.

FIG. 9 is an exploded view of the engagement clutch for the front wheel drive of a two-wheel drive vehicle in accordance with the present invention.

FIG. 10 is a perspective view of an outer clutch plate of the engagement clutch of FIG. 9.

FIG. 13 is a side view of the torque limiting clutch of a two wheel drive motorcycle.

FIG. 14 is a side view of the sliding shafts of the front wheel drive system along the front fork of the two wheel drive motorcycle including needle bearings.

FIG. 15 is a top view of the sliding shafts of the front wheel drive system along the front fork of the two wheel drive motorcycle including ball bearings.

DETAILED DESCRIPTION

Figure 1:
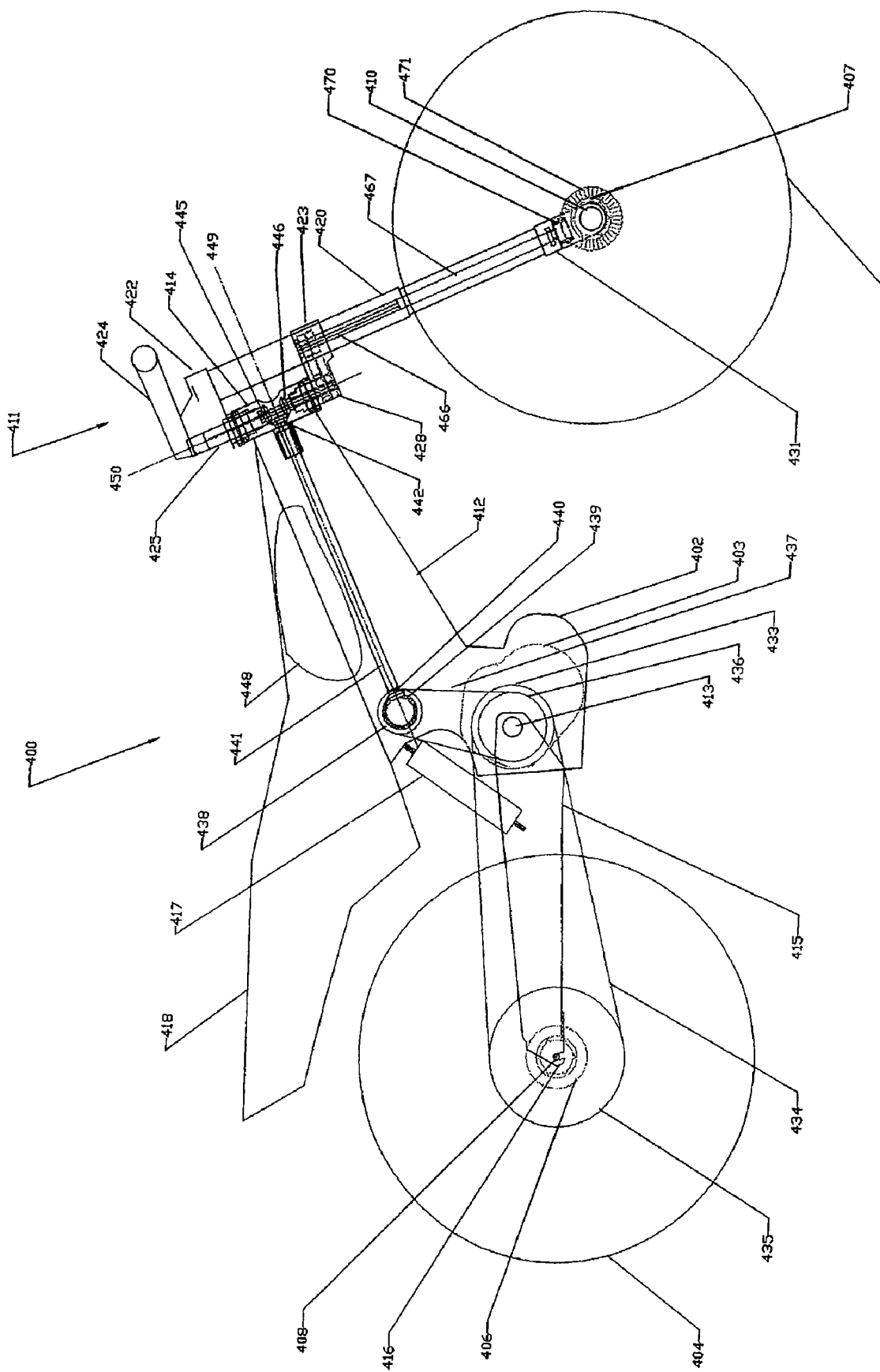
FIG. 1 shows a side view of an embodiment of a two-wheel drive motorcycle of the present invention with the front wheel drive originating directly from a transmission located at the engine.
Figure 6:
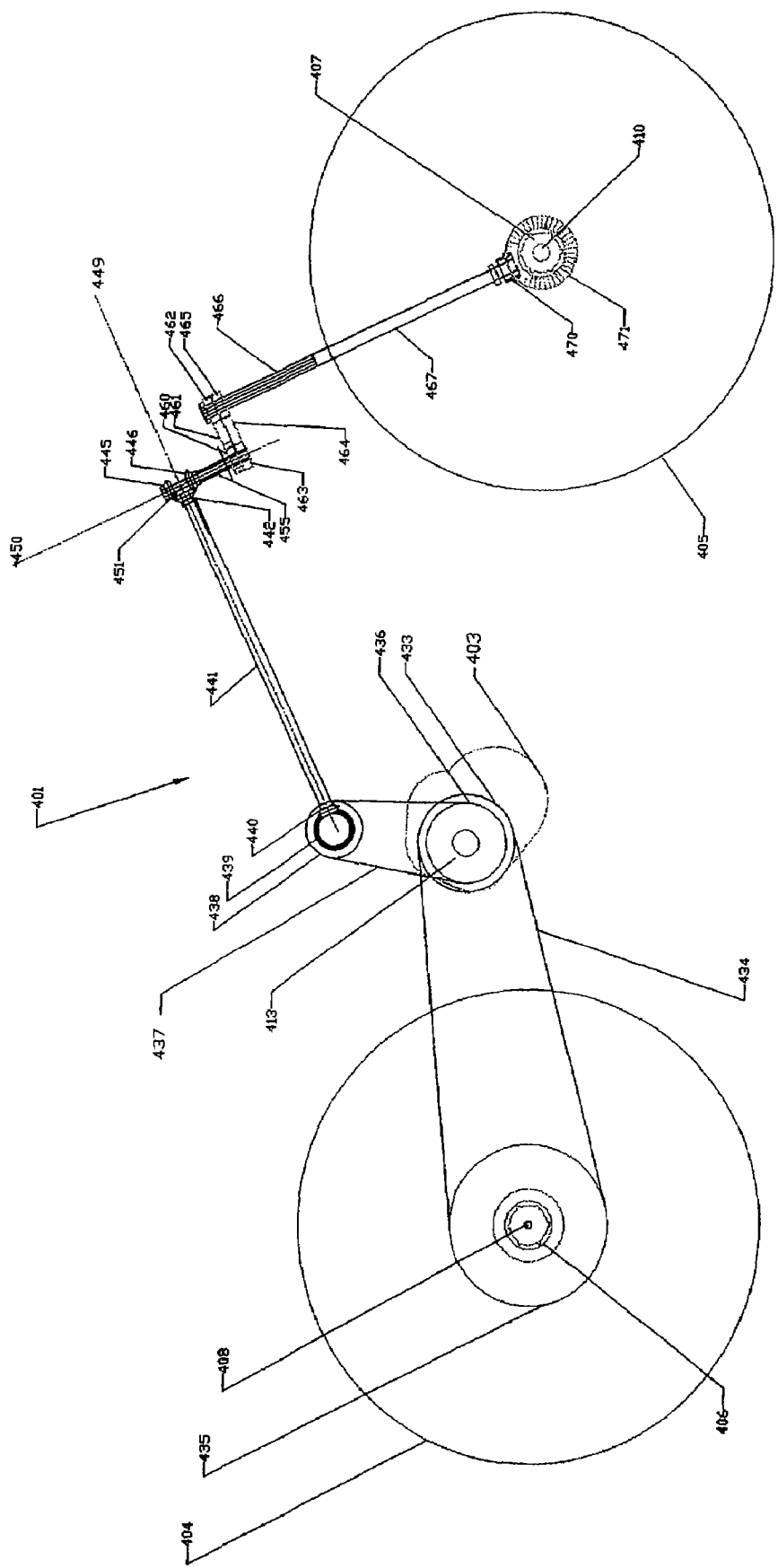
FIG. 6 is a side view of the rear wheel and front wheel drive system of a two-wheel drive motorcycle according to the present invention.

First Embodiment of the Invention Illustrating a Two-Wheel Drive Motorcycle with a Drive System Originating from the Engine and Transmission FIG. 1 is a side view of the first embodiment of the invention illustrating a two-wheel drive motorcycle 400 with a motorcycle front wheel drive 401 (see FIG. 6) originating directly from an engine 402 and motorcycle transmission 403. FIG. 6 is a side view of the rear wheel and front wheel drive system of a two-wheel drive motorcycle according to the present invention. The two-wheel drive motorcycle 400 of the present embodiment includes a rear wheel 404 and a front wheel 405. The rear wheel 404 further includes a rear wheel hub 406 and the front wheel further includes a one-way front wheel hub 407. The rear wheel 404 and rear wheel hub 406 rotate about a rear wheel axle 408 that is attached to a motorcycle frame. The front wheel 405 rotates about a front wheel axle 410 that is attached to a motorcycle steering mechanism 411 of the two-wheel drive motorcycle 400. The motorcycle frame further includes a forward frame section 412 that includes a pivot point 413 at its rear end and a motorcycle head tube 414 at its forward end. A right rear wheel support arm 415 and a left rear wheel support arm (not shown) pivotally attach at opposite sides of the pivot point. A right support arm dropout 416 and a left support arm dropout (not shown) on the right rear wheel support arm 415 and left rear wheel support arm (not shown), respectively, attach to the rear wheel axle 408 and support the rear wheel 404. A rear suspension 417 pivotally attaches between the right rear wheel support arm 415 and left rear wheel support arm (not shown) and to the forward frame section 412. The rear suspension 417 expands and contracts to accommodate movement of the rear wheel 404 around the pivot point 413 in order to absorb shock and bumps and provide a smoother ride. Additionally, as is well known in the art, the forward frame section 412 can include innumerable combinations of frame tubing, bars, and other supporting members to support the engine 402, motorcycle transmission 403, a seat 418, and the motorcycle steering mechanism 411.

Figure 2:
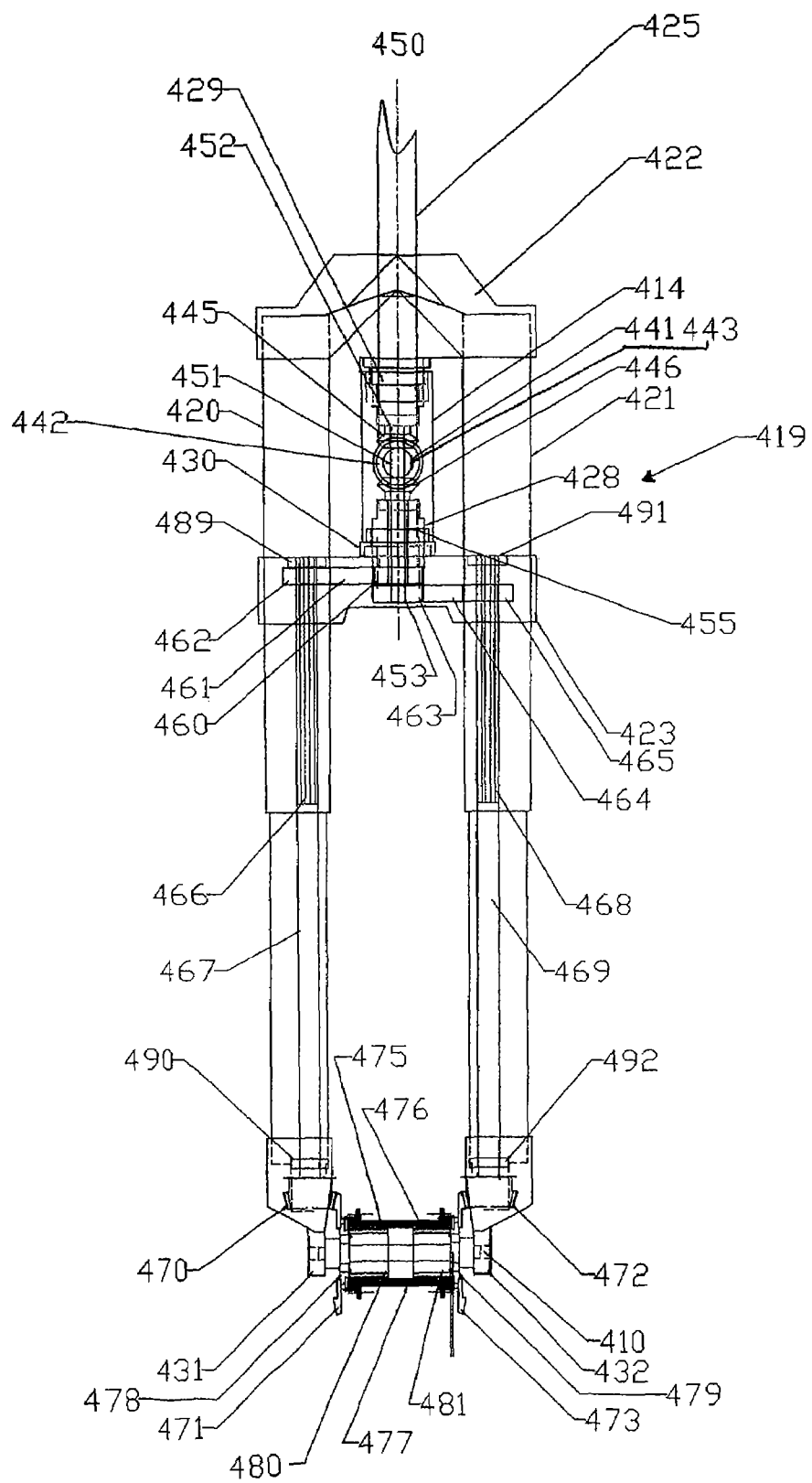
FIG. 2 is a front view of the front fork for a two-wheel drive motorcycle of the present invention with symmetrical drive shafts.
Figure 3:
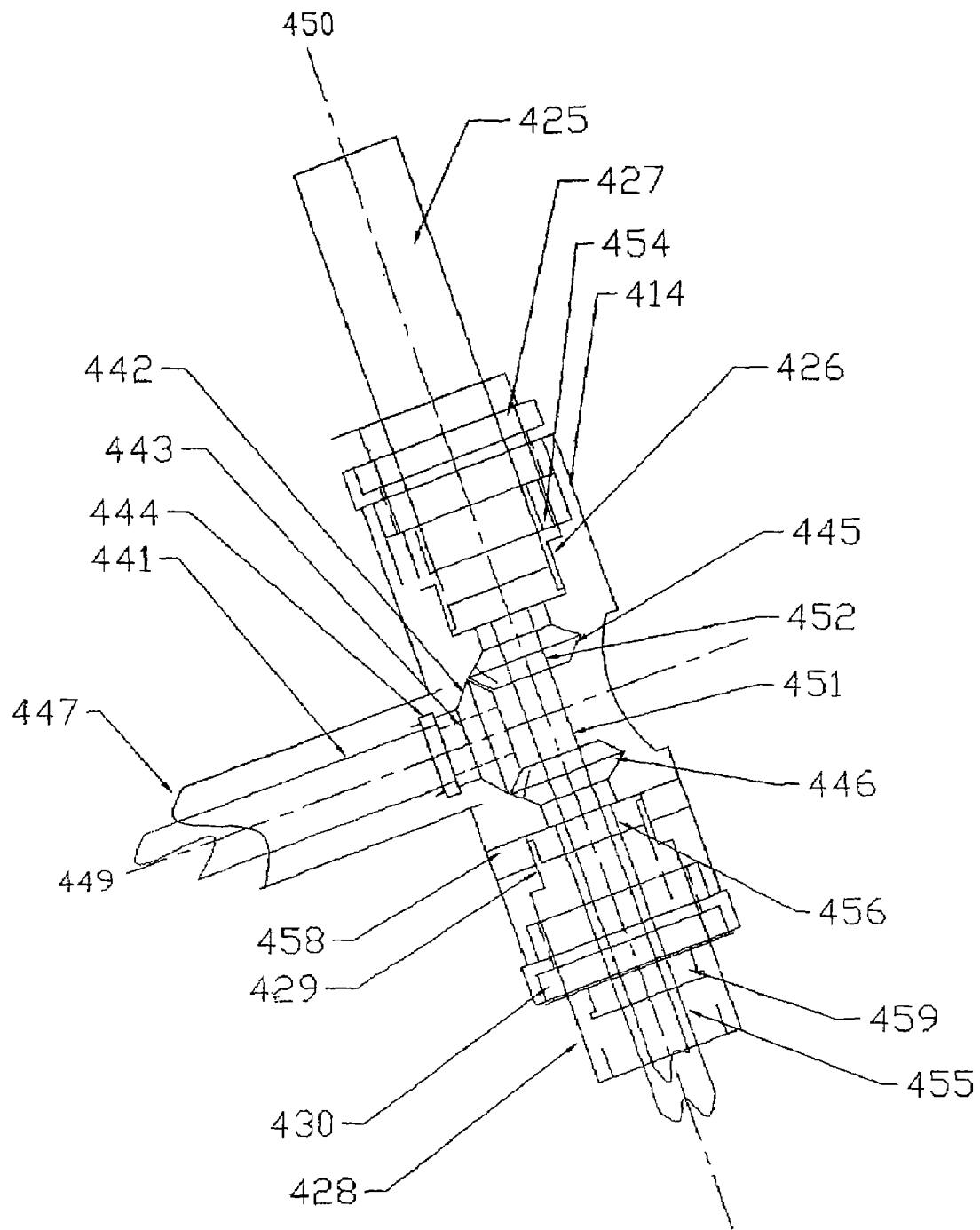
FIG. 3 is a side view of the head tube and cut-away neck tube for a two-wheel drive motorcycle according to the present invention.

As shown in FIGS. 1-3, the motorcycle steering mechanism 411 is rotatably mounted on the forward frame section 412 within the motorcycle head tube 414 and includes a motorcycle shock-absorbing front fork 419 that rotatably attaches the front wheel 405. The motorcycle shock-absorbing front fork 419 adjusts in length to absorb bumps and provide the rider with a smoother ride. The motorcycle shock-absorbing front fork 419 further includes a right motorcycle fork tube 420 and a left motorcycle fork tube 421 that are held in parallel to each other by an upper motorcycle fork crown 422 and a lower motorcycle fork crown 423. The upper motorcycle fork crown 422 further supports the motorcycle handlebars 424 and attaches an upper steering tube 425 which is rotatably supported at its lower end 426 within the motorcycle head tube 414 on an upper motorcycle head tube bearing 427. The lower fork crown 423 further attaches a lower steering tube 428 which is rotatably supported at its upper end 429 within the motorcycle head tube 414 on a lower motorcycle head tube bearing 430.

The right motorcycle fork tube 420 and left motorcycle fork tube 421 further include a right fork dropout 431 and a left fork dropout 432, respectively, that attach the lower ends of each motorcycle fork tube 420, 421 to the front wheel axle 410.

In the present embodiment, the engine 402 transfers power to the rear wheel 404 through the motorcycle transmission 403 to an attached first transmission drive sprocket 433 that in turn drives a rear drive chain 434 and a rear wheel drive sprocket 435 that is attached to and powers the rear wheel hub 406 and the rear wheel 404. Alternatively, as is well known in the art, the rear wheel 404 could be powered by a rear drive shaft (not shown) directly from the transmission to a rear drive gear (not shown) mounted on the rear wheel hub 406.

In the present embodiment of the invention as shown in FIGS. 1-6, the engine 402 transfers power through a motorcycle front wheel drive 401 located within the forward frame section 412, the motorcycle head tube 414 and the motorcycle shock-absorbing front fork 419 to the front wheel 405. More specifically, the engine 402 transfers power through the motorcycle transmission 403 to a second transmission drive sprocket 436. The second transmission drive sprocket 436, in turn, transfers power through a front drive chain 437 to a front drive sprocket 438. A first front drive gear 439 mounts circumferentially on the front drive sprocket 438 and transfers power to a second front drive gear 440 that is attached to the rear end of a main front drive shaft 441. Within the motorcycle head tube 414 of the present embodiment as shown in FIGS. 2 and 3, a motorcycle head tube gear 442 attaches at the front end 443 of the main front drive shaft 441 and meshes with and transfers power to an upper head tube gear 445 and a lower head tube gear 446.

The main front drive shaft 441 is contained within a main drive tube 447 in the present embodiment and is supported at each end with main drive shaft bearings 444. An alternative configuration would eliminate the need for the main drive tube 447 by supporting the main front drive shaft 441 at each end with the forward frame section 412. Since the main front drive shaft 441 is located within the forward frame section 412 there is little risk to the rider of danger from the rotating main front drive shaft 441 and enclosure within a separate main drive tube 447 may not be necessary and should not be construed as limiting the present invention. Thus, an important consideration for supporting the motorcycle front wheel drive 401 within the forward frame section 412 is that the front drive sprocket 438 with attached first front drive gear 439 and second front drive gear 440 should be firmly held in place to ensure smooth and efficient meshing and power transfer to the main front drive shaft 441. Additionally, the main front drive shaft 441 should be firmly supported at both ends to enable free rotation, but smooth transfer of power through the motorcycle head tube gear 442 to the upper head tube gear 445 and lower head tube gear 446 within the motorcycle head tube 414.

The use of the second transmission sprocket 436, the front drive chain 437 and the front drive sprocket 438 in the present embodiment is not to be construed as limiting the present invention. The front drive chain 437 could easily be replaced by a second front drive shaft (not shown) that receives power directly from the motorcycle transmission 403 and transmits power to the main front drive shaft 441 through either a universal joint system (not shown) or through a pair of meshing gears (not shown) attached at the front end of a second front drive shaft (not shown) and rear end of the main front drive shaft 441. One reason for having a front drive chain 437 and main front drive shaft 441 is to provide the appropriate clearance around the engine 402 and gas tank 448 or battery (not shown) of the two-wheel drive motorcycle 400.

It is possible, therefore, that certain configurations of the two-wheel drive motorcycle 400 could feature an alternate configuration for a main drive shaft (not shown) that transfers power directly from the motorcycle transmission 403 to the motorcycle head tube gear 442. Alternatively, a two-wheel drive motorcycle that transfers power directly from the rear wheel 404 to the motorcycle head tube gear 442 is contemplated (such as the front wheel drive system shown in FIG. 11). Such a configuration would utilize linkages, chain and sprocket components and telescoping universal joints (not shown) to accommodate movement of the rear suspension 417 and alternative motorcycle frame dimensions and designs. Additionally, an important consideration is that the gearing ratio from the engine to the front wheel or from the rear wheel to the front wheel should be adjusted (by varying the number of gear or sprocket teeth, as is well known in the art) to preferably result in a front wheel that is just slightly under-driven with respect to the rear wheel.

The motorcycle head tube gear 442 is located within the motorcycle head tube 414 at or very near the centerline 449 of the two-wheel drive motorcycle 400 immediately behind the axis of steering 450 of the motorcycle steering mechanism 411. Positioning the motorcycle head tube gear 442 and the front end 443 of the rotating main front drive shaft 441 on the center line 449 of the two-wheel drive motorcycle 400 will result in minimal torque reactions that could effect steering and control. Similarly, the upper head tube gear 445 and lower head tube gear 446 are located within the motorcycle head tube 414 at or very near the axis of steering 450 of the motorcycle steering mechanism 411 to minimize or eliminate torque reactions that could effect steering and control.

In transferring power from the main front drive shaft 441 through the motorcycle head tube 414, the upper head tube gear 445 is attached to an inner drive tube 451 and includes an upper end 452 and a lower end 453 with the upper end 452 being rotationally supported within the upper steering tube 425 on an upper steering tube bearing 454 and the lower end 453 being rotationally supported within the lower motorcycle fork crown 423. The lower head tube gear 446 is attached to an outer drive tube 455 that includes an upper end 456 and a lower end 457 and is rotationally supported within the lower steering tube 428 at upper end 456 on a first lower steering tube bearing 458. A second lower steering tube bearing 459 provides additional rotation support to the outer drive tube 455. In the present embodiment, the inner drive tube 451 is positioned within and rotates independently from the outer drive tube 455 at or very near the axis of steering 450. Moreover, the lower end 453 of the inner drive tube 451 extends through and below the lower end 457 of the outer drive tube 455. The number, type, and positioning of the support bearings 454, 458, 459 on the inner drive tube 451 and outer drive tube 455 should not be construed as limiting the present invention since any number of bearings adequate to support the motorcycle front wheel drive 401 within the motorcycle head tube 414 is contemplated.

Since the upper head tube gear 445 and lower head tube gear 446 mesh with the motorcycle head tube gear 442 on opposite sides of the motorcycle head tube gear 442, the upper head tube gear 445, including the attached inner drive tube 451, and the lower head tube gear 446, including the attached outer drive tube 455, rotate in opposite directions relative to each other within the motorcycle head tube 414, below the upper steering tube 425 and above the lower steering tube 428. This configuration enables rotation of the head tube gears 442, 445, 446 within the motorcycle head tube 414 and further permits rotation of the motorcycle steering mechanism 411 around the motorcycle front wheel drive 401. Furthermore, the upper head tube gear 445, including the attached inner drive tube 451, and the lower head tube gear 446, including the attached outer drive tube 455, are located at or very near the axis of steering 450 of the motorcycle steering mechanism 411 in order to minimize and counterbalance the torque reactions caused by the rotating motorcycle front wheel drive 401 within the motorcycle head tube 414.

Figure 4:
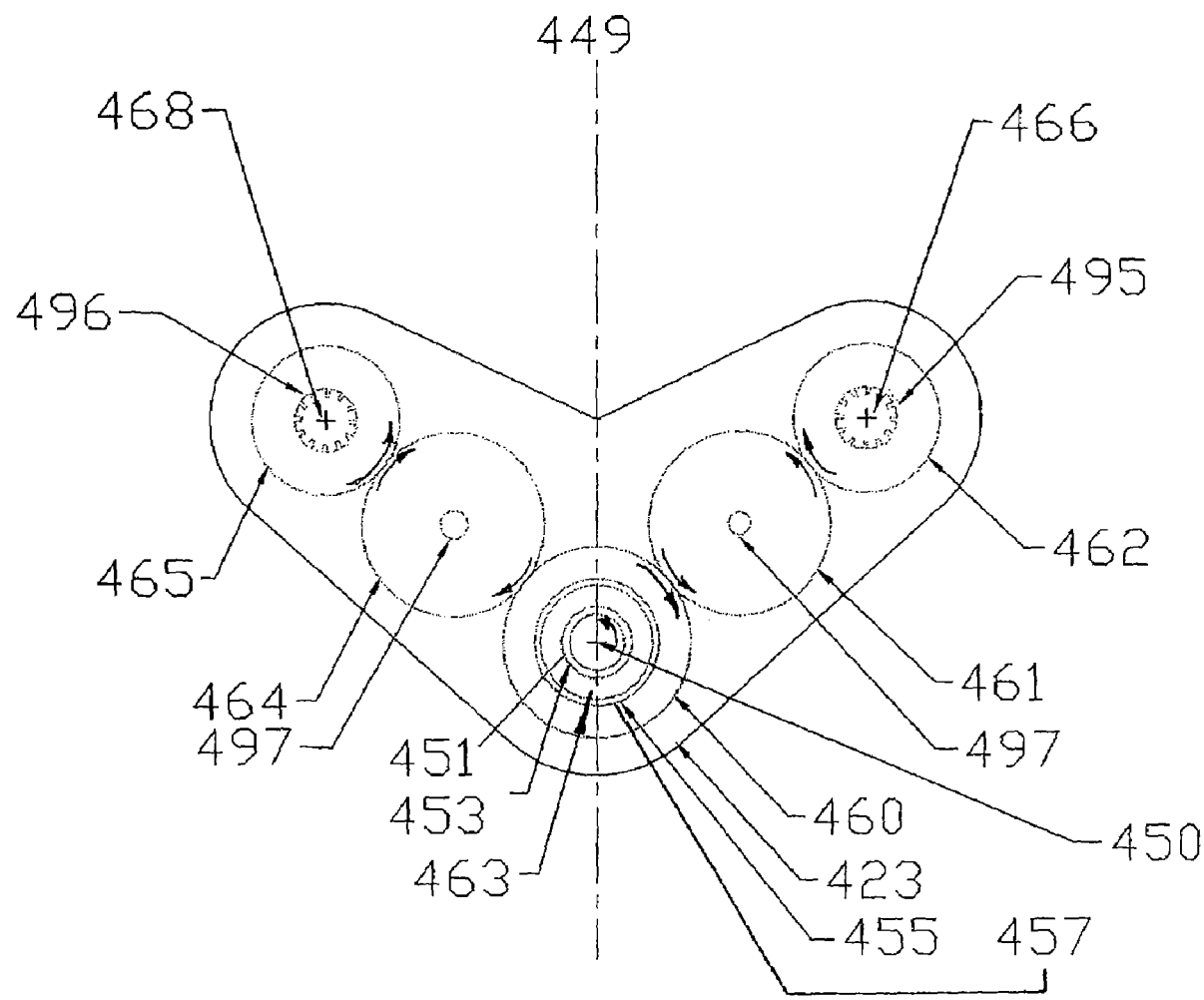
FIG. 4 is a top view of the series of meshing gears within the fork crown of the two-wheel drive motorcycle of the present invention.

As shown in FIGS. 2 and 4, a first series of meshing crown gears 460, 461, 462 are driven by the outer drive tube 455 and a second series of meshing crown gears 463, 464, 465 are driven by the inner drive tube 451. More specifically, the lower end 457 of the outer drive tube 455 attaches a first crown gear 460 that meshes with and drives a second crown gear 461, that meshes with and drives a third crown gear 462. Similarly, the lower end 453 of the inner drive tube 451 attaches a fourth crown gear 463 that meshes with and drives a fifth crown gear 464, that meshes with and drives a sixth crown gear 465.

The positioning of the first series of meshing crown gears 460, 461, 462 and the second series of meshing crown gears 463, 464, 465 within the lower motorcycle fork crown 423 serves several purposes: For example, the lower motorcycle fork crown 423 can act essentially as a gear box to hold the meshing crown gears 460, 461, 462, 463, 464, 465 in a fixed position while enabling free rotation on short gear shafts 497 and support bearings (not shown). Also, for example, the lower fork crown encloses the meshing crown gears 460, 461, 462, 463, 464, 465 to reduce exposure of the moving parts that could endanger the rider. Third, the first series of meshing crown gears 460, 461, 462, that is driven by the outer drive tube 455 rotates in an opposite and counterbalancing direction relative to the respective second series of meshing crown gears 463, 464, 465 that is driven by the inner drive tube 451. The meshing crown gears 460, 461, 462, 463, 464, 465 as shown, are of helical or spiral design, however, straight-teeth gears could also be used. The design and configuration of the gears, as disclosed herein, including number of gears, design of meshing teeth, and positioning within the steering mechanism is not to be construed as limiting the present invention. Moreover, the positioning of the meshing crown gears 460, 461, 462, 463, 464, 465 within the lower motorcycle fork crown 423 is not to be construed as limiting since they could easily be positioned within the upper fork crown 422 or in separate fork gear supports (not shown) in the motorcycle steering mechanism 411 or motorcycle shock-absorbing front fork 419.

Stated more specifically, when viewed from above (the rider's perspective) as shown in FIG. 4, the first crown gear 460 is driven by the outer drive tube 455 in a clockwise direction and the fourth crown gear 463 that is driven by the inner drive tube 451 and located directly below the first crown gear 460 rotates in a counter-clockwise direction. Both the first crown gear 460 and the fourth crown gear 463 are located at or very near the axis of steering 450 and centerline 449 and the opposite rotations of each crown gear 460, 463 would tend to counterbalance and cancel or minimize the potential torque reactions caused by rotation of each crown gear 460, 463. Moving away from the axis of steering 450 and centerline 449 within the lower motorcycle fork crown 423, the second crown gear 461 is driven in a counterclockwise direction by the first crown gear 460 while the fifth crown gear 464 is driven in a clockwise direction by the fourth crown gear 463. The opposite rotational directions of the second crown gear 461 and fifth crown gears 464 at symmetrical distances from the axis of steering 450 and centerline 449 would tend to counterbalance and cancel or minimize the potential torque reactions caused by rotation of each crown gear 461, 464. Finally, the third crown gear 462 is driven in a clockwise direction by the second crown gear 461 while the sixth crown gear 465 is driven in a counterclockwise direction by the fifth crown gear 464. The third crown gear 462 and sixth crown gear 465 are positioned symmetrically farther from the axis of steering 450 and centerline 449 within the lower motorcycle fork crown 423 and the opposite rotational directions of each crown gear 462, 465 would tend to counterbalance and cancel or minimize the potential torque reactions.

Thus, through opposite rotation and symmetrical positioning relative to the axis of steering 450 and centerline 449, the counterbalanced crown gear pairs 460 and 463; 461 and 464; 462 and 465, the rotational torque and moment of inertia is counterbalanced and cancelled or minimized within the lower motorcycle fork crown 423 enabling the rider to maintain better control of the two-wheel drive motorcycle 400. The number, positioning, and rotational direction of the crown gears 460, 461, 462, 463, 464, 465 should not be construed as limiting the present invention. Those skilled in the art could easily envision alternate combinations of meshing crown gears that would have similar symmetrical qualities and counterbalancing configurations.

In the present embodiment, the third crown gear 462 and sixth crown gear 465 are located within the right motorcycle fork tube 420 and left motorcycle fork tube 421 respectively. The third crown gear 462 is splined on its inner surface and receives a right upper splined end 466 of a right fork drive shaft 467 and sixth crown gear 465 has an inner splined surface 496 and receives a left upper splined end 468 of a left fork drive shaft 469. The fork drive shafts 467, 469 are supported within the motorcycle fork tubes 420, 421 on fork tube bearings 489, 490, 491, 492 in a manner that permits rotation of the fork drive shafts 467, 469 as well as movement up and down within the crown gears 462, 465 but prohibits lateral movement within the motorcycle fork tubes 420, 421. In this way, the rotating motorcycle front wheel drive 401 will also adjust for movement of the motorcycle shock-absorbing front fork 419. In an alternative configuration, the splined upper ends 466, 468 could be further rotationally supported on bearings or bushings above the crown gears 462, 465 to provide additional support within the motorcycle fork tubes 420, 421.

The right splined upper end 466 of the right fork drive shaft 467 slides into and is powered by the third crown gear 462, and the left splined upper end 468 of the left fork drive shaft 469 slides into and is powered by the sixth crown gear 465 as the motorcycle front wheel drive 401 rotates. Moreover, due to the opposite rotation of the third crown gear 462 and sixth crown gear 465, as discussed above, the right fork drive shaft 467 and left fork drive shaft 469 rotate in opposite directions within the right motorcycle fork tube 421 and left motorcycle fork tube 422 respectively, thereby counterbalancing and canceling or minimizing the torque reactions and inertia caused by the rotating fork drive shafts 467, 469.

The right fork drive shaft 467 attaches a right fork drive shaft gear 470 that meshes with and drives a right front hub gear 471. Similarly, the left fork drive shaft 469 attaches a left fork drive shaft gear 472 that meshes with and drives a left front hub gear 473. As shown in FIGS. 2 and 4, the clockwise rotation (as viewed from the rider) of the third crown gear 462, right fork drive shaft 467, and right fork drive shaft gear 470 will cause and result in forward rotation of the right front hub gear 471 and attached front wheel 405 (relative to the ground). Similarly, the counterclockwise rotation (as viewed from the rider) of the sixth crown gear 465, left fork drive shaft 469, and left fork drive shaft gear 472 will cause and result in forward rotation of the left front hub gear 473 and attached front wheel 405 (relative to the ground).

An alternative embodiment, to enable adjustment of the motorcycle shock-absorbing front fork 419 in response to bumps would be to configure the right fork drive shaft 467 and left fork drive shaft 469 into two separate sliding sections. The upper sliding sections (not shown) would be attached at the third crown gear 462 and sixth crown gear 465 respectively and would rotate with and slide over the lower sliding sections (not shown) that would be attached to the right fork drive shaft gear 470 and left fork drive shaft gear 472 respectively.

Thus, in summary, the present embodiment of the two-wheel drive motorcycle 400 discloses a motorcycle front wheel drive 401 that includes components positioned on the axis of steering 450 and centerline 449 and symmetrically positioned in a counterbalancing fashion relative to the axis of steering 450 within the motorcycle steering mechanism 411 and motorcycle shock-absorbing front fork 419. Power transferred from the engine 402 through the motorcycle transmission 403 drives the second transmission drive sprocket 436 which transfers power through a front drive chain 437 to a front drive sprocket 438. A first front drive gear 439 mounts circumferentially on the front drive sprocket 438 and meshes with and transfers power to the second front drive gear 440 that is attached to and transfers power to the main front wheel drive shaft 441.

To transfer power through the motorcycle head tube 414 and the left motorcycle fork tube 421 via the motorcycle head tube gear 442 attached to the front end 443 of the main front drive shaft 441 within the motorcycle head tube 414. The motorcycle head tube gear 442 meshes with and transfers power to the upper head tube gear 445 that is attached to the inner drive tube 451. The lower end 453 of the inner drive tube 451 attaches and powers the fourth crown gear 463 that meshes with and drives the fifth crown gear 464, that meshes with and drives the sixth crown gear 465. The left splined upper end 468 of the left fork drive shaft 469 slides into and is driven by the rotation of the sixth crown gear 465 to transfer power to the left fork drive shaft 469 that is located within the left motorcycle fork tube 421. The left fork drive shaft gear 472 is attached to and driven by the left fork drive shaft 469, and further, meshes with and drives a left front hub gear 473 that is attached to and drives the one-way front wheel hub 407 and attached front wheel 405.

To counterbalance the transfer of power through the left motorcycle fork tube 421, rotational power of the motorcycle front wheel drive 401 is transferred symmetrically through the motorcycle head tube 414 and right motorcycle fork tube 420. The motorcycle head tube gear 442 attaches to the front end 443 of the main front drive shaft 441 within the motorcycle head tube 414 and meshes with and transfers power to the lower head tube gear 446 that is attached to the outer drive tube 455. The lower end 457 of the outer drive tube 455 attaches and powers the first crown gear 460 that meshes with and drives the second crown gear 461, that meshes with and drives the third crown gear 462. The right splined upper end 466 of the right fork drive shaft 467 slides into and is driven by the third crown gear 462 to transfer power to the right fork drive shaft 467 that is located within the right motorcycle fork tube 420. The right fork drive shaft gear 470 is attached to and driven by the right fork drive shaft 467, and further, meshes with and drives a right front hub gear 471 that is attached to and drives the one-way front wheel hub 407 and attached front wheel 405.

As discussed previously, the counteracting rotation and symmetrical placement of the motorcycle front wheel drive 401 within the motorcycle shock-absorbing front fork 419 relative to the axis of steering 450 and the centerline 449, thereby counterbalancing and canceling or minimizing the torque reactions and inertia caused by the rotating motorcycle front wheel drive 401 components is not to be construed as limiting.

Numerous configurations that would place components along the steering axis 450 and within the motorcycle head tube 414 are contemplated. Additionally, numerous configurations for varying the number, symmetrical placement, and the direction of counterbalancing rotation of the crown gears 460, 461, 462, 463, 464, 465 within the lower motorcycle fork crown 423 is contemplated. While internalizing the motorcycle front wheel drive 401 within the lower motorcycle fork crown 423, right motorcycle fork tube 420 and left motorcycle fork tube 421 is preferred, this configuration should not be construed as limiting because one could easily locate certain front wheel drive components external to the motorcycle shock-absorbing front fork 419.

Figure 11:
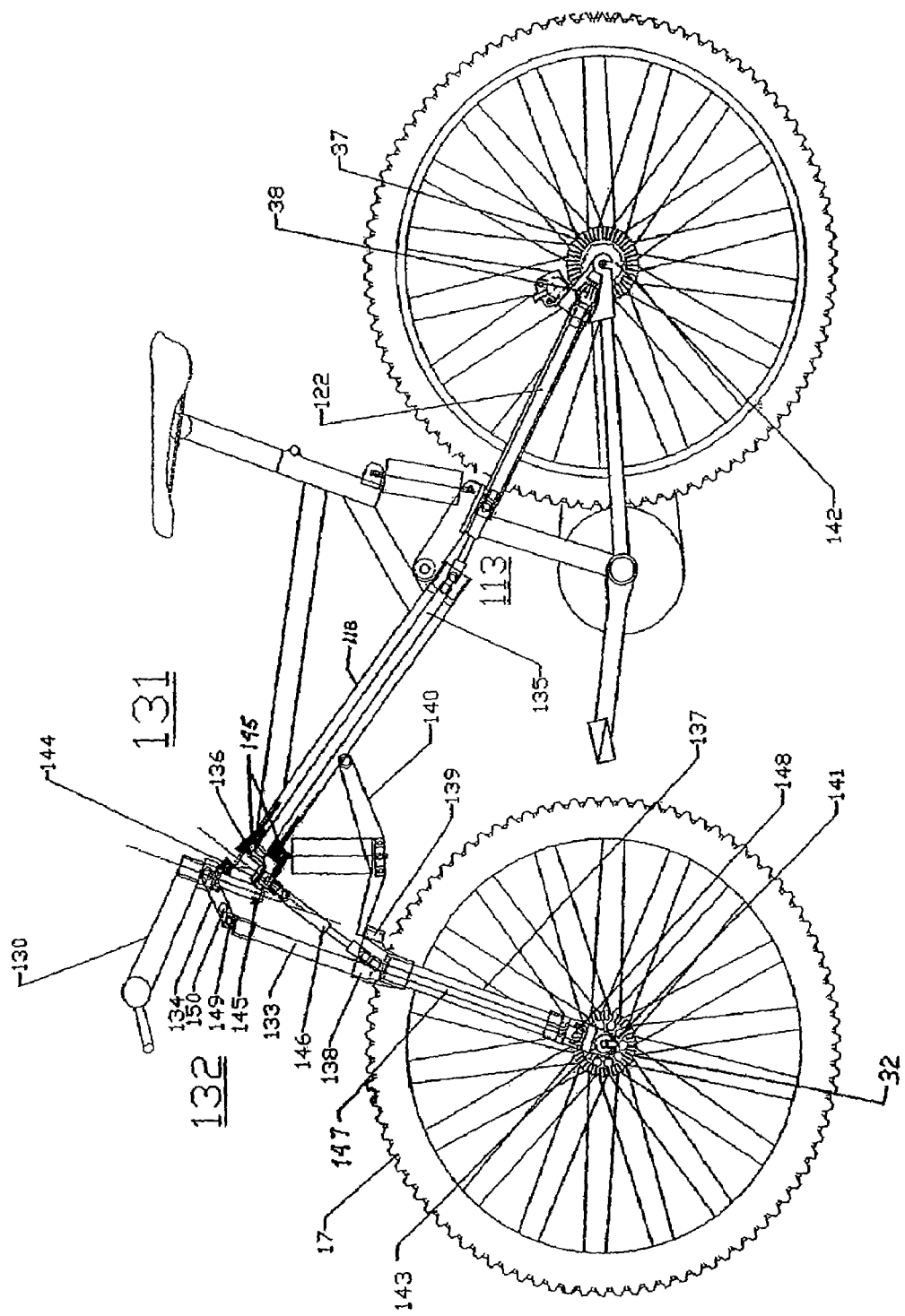
FIG. 11 is a side view of a two-wheel drive full suspension mountain bike featuring a four-bar linkage front suspension system with an adjustable rake feature.

While the present embodiment also features the upper steering tube 425 and lower steering tube 428, alternate configurations that enable rotation of the motorcycle steering mechanism 411 around the motorcycle head tube gear 442, the upper head tube drive gear 445, and the lower head tube gear 446 are contemplated, the steering tube could also be a single unit featuring a cut-away section (not shown) to enable the free rotation of the motorcycle steering mechanism 411 around the meshing head tube gears 442, 445, 446. Additionally, those skilled in the art will recognize that alternative drive systems, including a ball bearing drive system could easily replace chain and shaft front wheel drive. Moreover, the motorcycle front wheel drive 401 could easily originate directly from the rear wheel 404 in a configuration similar to that disclosed in related applications and as shown in the embodiment of FIG. 11.

Figure 5:
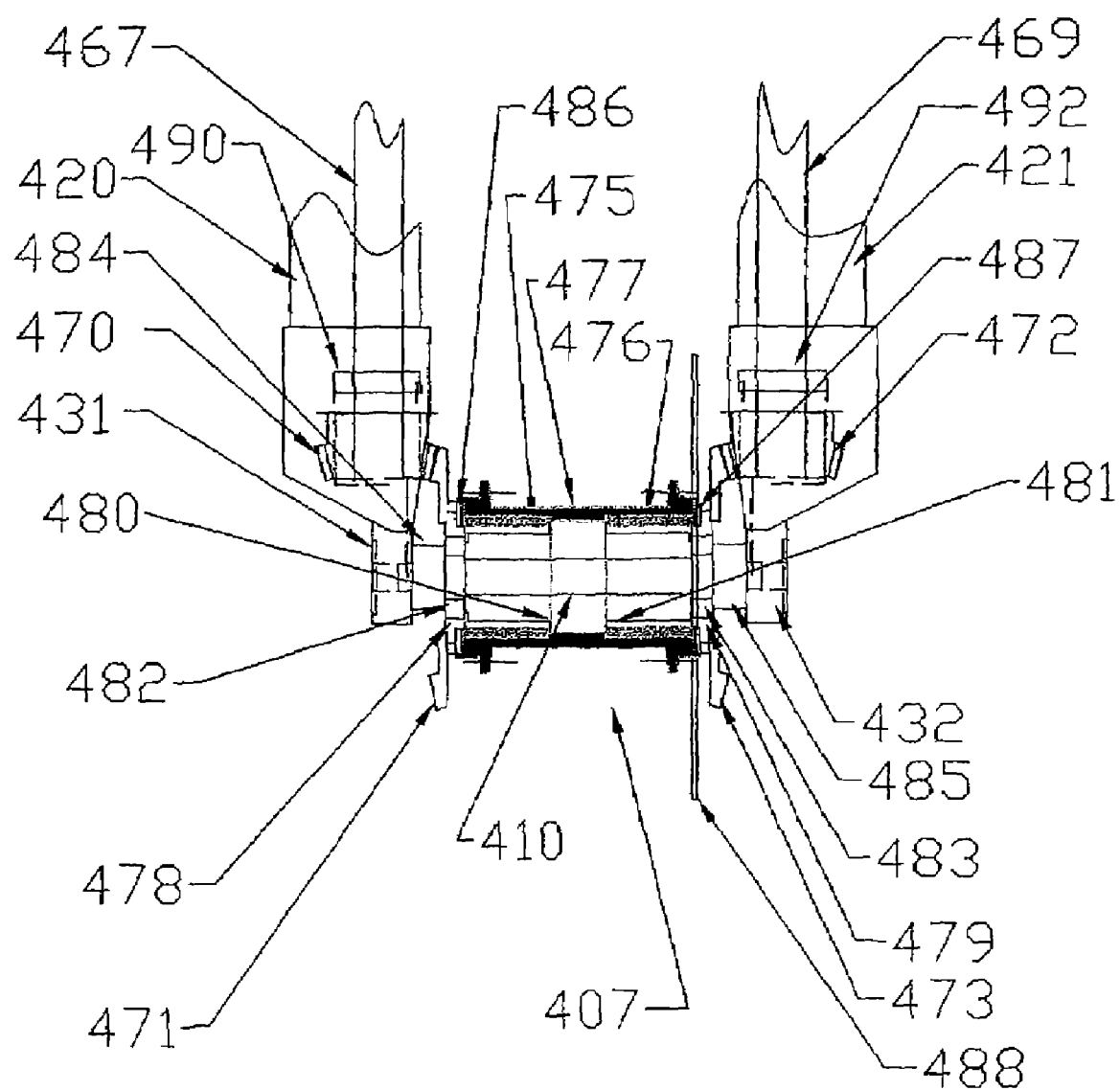
FIG. 5 is front view of a one-way front hub with a roller clutch for a two-wheel drive motorcycle in accordance with the present invention.

Second Embodiment of the Invention Illustrating a One-Way Front Hub with Roller Clutch for a Two-Wheel Drive Motorcycle FIG. 5 is a front view of a one-way front wheel hub 407 for a two-wheel drive motorcycle 400 with a right roller clutch 475 and a left roller clutch 476. In the present embodiment, the one-way front wheel hub 407 includes a motorcycle outer hub shell 477, a right inner hub shell 478 and a left inner hub shell 479. The right inner hub shell 478 further includes a right roller clutch surface 480 and the left inner hub shell 479 further includes a left front roller clutch surface 481. In the present embodiment, the right inner hub shell 478 and left inner hub shell 479 are separate pieces to enable easy assembly, however, they could also be a single piece. Alternatively, the right inner hub shell 479 and left inner hub shell 480 could each be made of several pieces in order to accommodate a motorcycle torque-limiting clutch configuration (not shown) similar to the torque-limiting clutch assembly 299 discussed in the third embodiment, below.

The front wheel axle 410 rotationally attaches within the right inner hub shell 478 and left inner hub shell 479 and is supported via a first front wheel axle bearing 482 and a second front wheel axle bearing 483. The front wheel axle 410 attaches at each end to the right fork dropout 431 and left fork dropout 432 and is held in place within the right inner hub shell 478 and left inner hub shell 479 by a first front hub end cap 484 and a second front hub end cap 485. A first front hub bearing 486 is positioned between the motorcycle outer hub shell 477 and the right inner hub shell 478 allowing the motorcycle outer hub shell 477 and right inner hub shell 478 to rotate independently while supporting the lateral forces of the one-way front wheel hub 407. Similarly, a second front hub bearing 487 is positioned between the motorcycle outer hub shell 477 and the left inner hub shell 479 allowing the motorcycle outer hub shell 477 and left inner hub shell 479 to rotate independently while supporting the lateral forces of the one-way front wheel hub 407. The motorcycle outer hub shell 477 further attaches to the front motorcycle wheel 405 as is well known in the art. The motorcycle outer hub shell 477 also attaches to a motorcycle disk brake rotor 488 as shown in the present embodiment.

The roller clutch 480, 481 is well known in the art and consists of inner and outer cylinders (not shown) defining an internal space in which a series of rollers (not shown) is contained. The inner cylinder further includes a series of ramp-like structures (not shown) separating each individual roller. During operation of the roller clutch 480, 481, rotation of the inner cylinder in one direction forces the rollers down to the bottom of the ramps and permits the inner cylinder to rotate in a direction opposite the outer cylinder. However, when the inner cylinder of the roller clutch rotates in the other direction the rollers (not shown) roll up the ramp-like structures (not shown) and wedge near the top of the ramp-like structures of the inner cylinder wedging against the outer cylinder. The wedging of the rollers between the inner and the outer cylinders of the roller clutch rotationally locks the inner cylinder against the outer cylinder forcing them to rotate together.

The right front hub gear 471 attaches via bolts (not shown) to the right inner hub shell 478 and the left front hub gear 473 attaches via bolts (not shown) to the left inner hub shell 479. The right roller clutch 475 is press fitted into the motorcycle outer hub shell 477 and the right roller clutch surface 480 of the right inner hub shell 478 slides into the right roller clutch 475. Similarly, the left roller clutch 476 is press fitted into the motorcycle outer hub shell 477 and the left roller clutch surface 481 of the left inner hub shell 479 slides into the left roller clutch 476. As discussed above, this configuration enables free rotation of the motorcycle outer hub shell 477 relative to the right inner hub shell 478 and left inner hub shell 479 when the right inner hub shell 478 and left inner hub shell 479 rotate in one direction relative to the motorcycle outer hub shell 477. However, as described in the first embodiment, when the right and left fork drive shafts 467, 469 and right and left fork drive shaft gears 470, 472 power the right and left front hub gears 471, 473 respectively, the attached right and left inner hub shells 478, 479 rotate in the opposite direction and the right and left roller clutches 475, 476 become rotationally locked resulting in the corresponding rotation of the motorcycle outer hub shell 477 and attached front wheel (not shown). Thus, in this manner, rotational power through the front wheel drive 401 to the right and left front hub gears 471, 473 will result in rotation of the right and left inner hub shells 478, 479 and the corresponding rotation of the motorcycle outer hub shell 477 and front wheel (not shown) to produce a two-wheel drive motorcycle 400 driven by both wheels.

A roller clutch hub is uniquely suited for a two-wheel drive motorcycle because it transmits power virtually instantaneously to the front wheel. The use of a ratcheting one-way clutch would result in a slight delay in transfer of power to the front when the front wheel is under-driven with respect to the rear wheel because there are several degrees of backlash before the ratchet would engage to power the front wheel.

An additional advantage to using a roller clutch in a front hub, as disclosed herein, is that since the two-wheel drive motorcycle can be ridden in either two-wheel drive or rear-wheel-only drive, the use of a ratcheting one-way hub would result in a constant ratcheting sound when the front wheel free wheels. Moreover, the present embodiment also discloses the use of at least two roller clutches in the one-way front hub of the two-wheel drive motorcycle. The use of more than one roller clutch provides greater surface area to spread the radial forces of the driven front wheel. The ability to spread the forces along a greater surface eliminates the need for reinforcement sleeves.

The use and configuration of the one-way front hub 407 with roller clutches 475, 476 is not to be construed as limiting and alternate configurations are envisioned. One alternative configuration would utilize a sprag clutch (not shown) in place of the front roller clutches 475, 476. Similarly, a torque limiting clutch as shown in the third embodiment, below, could be included with the front wheel hub 407 of the two-wheel drive motorcycle 400 to reduce the likelihood of motorcycle front wheel drive 401 failure under extreme toque loads.

Third Embodiment of the Two-Wheel Drive Vehicle Illustrating a One-Way Front Hub with Roller Clutch and Torque Limiting Clutch FIG. 7 is a front view of a one-way front hub 213 for a two-wheel drive vehicle with a front roller clutch 214. In the present embodiment, the one-way front hub 213 includes an outer front hub shell 215 and an inner front hub shell 216. The inner front hub shell 216 further includes a front hub roller clutch surface 217. In the present embodiment, the inner front hub shell 216 and front hub roller clutch surface 217 are separate pieces to accommodate a torque limiting clutch assembly 299 discussed below and the inner front hub shell 216 further includes an inner hub spring shaft 312. However, the inner front hub shell 216 with front hub roller clutch surface 217 could also be a single piece in configurations without a torque-limiting clutch assembly 299.

A front axle 59 rotationally attaches within the inner hub shell 216 and is supported via a first front hub axle bearing 218 and near its other end within the outer hub shell 215 via a second front hub axle bearing 219. A third front hub axle bearing 306 may also be utilized to add support to the axle within the one-way front hub 213. The front axle 59 attaches at each end to the right front dropout 17 and left front dropout 18 of the front fork (not shown) of the two-wheel drive vehicle (not shown) and is held in place within the hub by a front hub end cap 304. A front hub bearing 305 is positioned between the outer hub shell 215 and inner hub shell 216 allowing the outer hub shell 215 and inner hub shell 216 to rotate independently while supporting the lateral forces of the one-way front hub 213. The outer front hub shell 215 further attaches to the spokes (not shown) of the front wheel (not shown) as is well known in the art. The outer front hub shell 215 may also attach to a disk brake rotor 300 as shown in the present embodiment.

The front bevel gear 32 attaches via bolts (not shown) to the inner front hub shell 216. A front roller clutch 214 is press fitted into the outer front hub shell 215. The front hub roller clutch surface 217 slides into the front roller clutch 214. As discussed above, this configuration enables free rotation of the outer front hub shell 215 relative to the inner front hub shell 216 when the inner front hub shell rotates in one direction. However, when pinion gear 31 of the front wheel drive (not shown) powers the front bevel gear 32, the attached inner front hub shell 216 rotates in the opposite direction and the front roller clutch 214 becomes rotationally locked resulting in the corresponding rotation of the outer front hub shell 215 and attached front wheel (not shown). Thus, in this manner, rotational power through the front wheel drive (not shown) to the front bevel gear 32 will result in rotation of the inner front hub shell 216 and the corresponding rotation of the outer front hub shell 215 and front wheel (not shown) to produce a bicycle driven by both wheels.

FIG. 8 features a disassembled view of the one-way front hub 213 with a front roller clutch 214 and also illustrating a torque-limiting clutch assembly 299. As illustrated, the inner hub shell 216 includes a first angled pressure plate 301 and the front hub roller clutch surface 217 includes a second angled pressure plate 302. These pressure plates fit internally to the standard one-way front hub 213. This configuration enables the front wheel drive (not shown) to rotate independently from the front wheel (not shown) in the event that extreme torque loads are transferred through the front wheel drive so that they can be relieved without damage to the system.

In the present embodiment, the first angled pressure plate 301 is circumferentially molded to the inner hub shell 216. The second angled pressure plate 302 is molded to the front hub roller clutch surface 217. The first angled pressure plate 301 abuts the second angled pressure plate 302 and is held in constant static contact with the second angled pressure plate 302 by an adjustable pressure plate spring 303. A first pressure plate spring end 309 of the adjustable pressure plate spring 303 is positioned within, and applies pressure at the inner pressure plate surface 307 of the front hub roller clutch surface 217 while a second pressure plate spring end 311 of the adjustable pressure plate spring 303 attaches to an adjustable pressure plate spring stop 308 that attaches to the end of the inner hub spring shaft 312. In the present embodiment, the adjustable pressure plate spring stop 308 screws into position onto the inner hub spring shaft 312 thus making the tension of the adjustable pressure plate spring 303 adjustable depending upon how far the adjustable pressure plate spring stop 308 is screwed onto the inner hub spring shaft 312. The adjustable pressure plate spring stop 308 is rotationally supported against the outer front hub shell 215 by the front hub bearing 305 and the inner hub spring shaft 312 is rotationally supported on the front axle 59 by the third front hub axle bearing 306.

The constant contact of the first angled pressure plate 301 with the second pressure plate 302 enables the transfer of rotational forces from the front bevel gear 32 through the inner hub shell 216 and torque limiting clutch assembly 299, through the front roller clutch 214, to the outer hub shell 215 to drive the front wheel 17. However, upon the transfer of a severe rotational torque load through the front wheel drive (not shown) that may otherwise cause breakage of certain front wheel drive parts, the rotational torque overcomes the static contact of the first angled pressure plate 301 against the second angled pressure plate 302 forcing the first angled pressure plate 301 to slip relative to the second angled pressure plate 302 by causing a shortening of the adjustable pressure plate spring 303. Severe drive system torque is, therefore, relieved and the first angled pressure plate 301 and second angled pressure plate 302 resume their static contact due to the pressure from the adjustable pressure plate spring 303.

A roller clutch hub is uniquely suited for a two-wheel drive vehicle because it transmits power virtually instantaneously and silently to the front wheel. The use of a ratcheting one-way clutch would result in a slight delay in transfer of power to the front wheel when the rear wheel slips because there are several degrees of backlash before the ratchet would engage to power the front wheel.

An additional advantage to using a roller clutch in a front hub, as disclosed herein, is that since the two-wheel drive vehicle can be ridden in either two-wheel drive or rear-wheel-only drive, the use of a ratcheting one-way hub would result in a constant ratcheting sound when the front wheel free wheels. Moreover, the second embodiment also discloses the use of at least two roller clutches in the one-way front wheel hub 407 of the two-wheel drive motorcycle 400. The use of more than one roller clutch provides greater surface area to spread the radial forces of the driven front wheel. The ability to spread the forces along a greater surface eliminates the need for reinforcement sleeves resulting in lighter hubs.

The use and configuration of the one-way front hub 213 with a roller clutch 214 and torque limiting one-way front hub clutch assembly 299 is not to be construed as limiting and alternate configurations are envisioned. One alternative configuration would utilize a sprag clutch (not shown) in place of the front roller clutch 214. Additionally, more than one roller clutch 214 could be included within the one-way front hub 213. Similarly, a torque limiting clutch 299 could be included with the front wheel hub 407 of the two-wheel drive motorcycle 400 to reduce the likelihood of motorcycle front wheel drive 401 failure under extreme toque loads.

For the one-way front hub 213, the outer front hub shell 215 and inner front hub shell 216 may be made of aluminum or any other light-weight metal capable of withstanding the axial and rotational forces generated by rotation of the one-way front hub 213 and the use of any particular material should not be considered as limiting to the present invention. Additionally, reinforcing sleeves around the outer front hub shell 215 are not necessary in the present embodiment. Finally, numerous configurations for the torque limiting clutch 299 are envisioned and the use of pressure plates 301, 302 and pressure plate springs should not be construed as limiting the mechanisms by which severe front wheel drive torque can be relieved.

Fourth Embodiment of the Two-Wheel Drive Vehicle Illustrating the Front Wheel Drive Engagement Clutch Referring to FIG. 9, the fourth embodiment of a two-wheel drive vehicle incorporates an engagement clutch 220 into the front wheel drive (not shown). The engagement clutch 220 provides the rider the option of operating the two-wheel drive bicycle in two-wheel drive mode when the engagement clutch 220 is engaged, or alternatively, in rear-wheel-only drive mode when the engagement clutch 220 is disengaged. In a configuration similar to the present embodiment, an engagement clutch 220 could be utilized with the two-wheel drive motorcycle 400 and either mounted on the motorcycle front wheel drive 401 at the engine 402 and motorcycle transmission 403 or on the rear wheel 404 (if a direct front wheel drive from the rear wheel 404 is used). Additionally, a hydraulic or hydrostatic engagement clutch, as is well known in the art could be utilized to enable the rider of the two-wheel drive motorcycle 400 to shift from rear-wheel only drive to two-wheel drive. In a two-wheel drive motorcycle 400 with front wheel drive 401 originating at the engine 402, and transmission 403, the engagement clutch 220 could be used to provide a motorcycle with rear-wheel-only drive, two-wheel-drive, or in certain conditions, front-wheel only drive by shifting the clutch to a setting that powers only the front wheel drive 401 and front wheel 405.

FIG. 9 illustrates a disassembled view of the engagement clutch 220 mounted on the one-way rear hub 200 of the two-wheel drive vehicle (not shown). As disclosed in the present embodiment, the entire engagement clutch 220 would fit in the space between the one-way rear wheel hub 200 and the left rear dropout (not shown) thus enabling use of standard frame spacing, standard rear hub dimensions, and standard bicycle components.

In the present embodiment as shown in FIG. 9, an inner clutch plate 221 attaches via bolts 222 to the disk brake mounting surface 204 of the outer hub shell 202. A clutch bearing 223 is press fitted onto the inner clutch plate's 221 outer edge 224 and a rear gear ring 225 is press fitted onto the clutch bearing 223 so that the inner clutch plate 221 and rear gear ring 225 rotate independently on the clutch bearing 223. Additionally, a flat needle bearing (not shown) may be placed between the inner clutch plate 221 and the rear gear ring 225 to support lateral forces within the engagement clutch 220. The inner edge 226 of the rear gear ring 225 is designed to receive an outer clutch plate 227. The outer clutch plate 227 has a series of rear gear ring stops 228 that fit into the series outer clutch plate receptors 229 on the inner edge 226 of the rear gear ring 225. Alternatively, the rear gear ring stops 228 and outer clutch plate receptors 229 could be replaced by any male and female spline configuration that would allow the outer clutch plate 227 and rear gear ring 225 to slide relative to each other. When assembled, the rear gear ring 225 and outer clutch plate 227 rotate in unison due to the positioning of the rear gear ring stops 228 of the outer clutch plate 227 within the outer clutch plate receptors 229 of the rear gear ring 225. The outer clutch plate 227 is held in place by a snap ring 230 inserted into a snap ring slot 231 of the rear gear ring 225.

The inner clutch plate 221 further includes a series of inner dog teeth 233 that face the outer clutch plate 227 when the engagement clutch 220 is assembled. Similarly, the outer clutch plate 227 further includes a series of outer dog teeth 234 that face the inner clutch plate 221 when the engagement clutch 220 is assembled. Each inner dog tooth 233 further includes a flat facing surface 235 and each outer dog tooth 234 further includes an opposing flat facing surface 236. Finally, the inner clutch plate 221 and outer clutch plate 227 are held apart when the engagement clutch 220 is assembled but not engaged by a circular clutch spring 237 that rests circumferentially along on the spring surface 232 of the rear bevel ring gear 225. The entire engagement clutch is positioned between the disk brake mounting surface 204 of the outer hub shell 202 and the left dropout 8 where the rear drive bevel gear 37 is positioned. FIG. 10 illustrates an alternate view of the outer clutch plate 227 showing the rear gear ring stops 228, the outer dog teeth 234, and the opposing flat facing surfaces 236.

Engagement of the engagement clutch 220 in the present embodiment is facilitated by a cable-actuated external shifting mechanism (not shown). To engage the engagement clutch 220, the rider shifts a cable actuation lever (not shown) on the steering mechanism (not shown). The resulting movement of the cable forces the external shifting mechanism against the outer clutch plate 227 which moves toward the inner clutch plate 221, compressing the circular clutch spring 237. When the outer clutch plate 227 and inner clutch plate 221 fully interlock, the opposing flat facing surfaces 236 of the outer dog teeth 234 on the outer clutch plate 227 come into contact with the flat facing surfaces 235 of the inner dog teeth 233 on the inner clutch plate 221 resulting in the engagement of the engagement clutch 220.

When the engagement clutch 220 is engaged, the front wheel drive operates to transfer power to the front wheel 17 as follows: Power is transferred from the rear drive sprockets (not shown) through the one-way rear hub (not shown). Rotation of the outer hub shell 202 powers the inner clutch plate 221 which transfers power through the flat facing surface 235 of inner dog teeth 233 to the opposing flat facing surfaces 236 of the outer dog teeth 234 of the interlocked outer clutch plate 227. The outer clutch plate 227 then transfers power to the rear gear ring 225 due to the interlocking of the rear gear ring stops 228 of the outer clutch plate 227 with the outer clutch plate receptors 229 of the rear gear ring 225. The rear gear ring 225 then transfers power to the front wheel drive (not shown) through the meshing drive shaft pinion gear (not shown) and straight main drive shaft (not shown). When the engagement clutch 220 is not engaged (the two-wheel drive bicycle is being operated in rear-wheel drive mode), the inner dog tooth gears 233 of inner clutch plate 221 and outer dog tooth gears 234 of the outer clutch plate 227 are forced apart by the circular clutch spring 237 and no power is transferred through the front wheel drive.

The disclosed engagement clutch 220 for the two-wheel drive vehicle is not to be construed as limiting the present invention. Those skilled in the art will recognize alternative designs that can be incorporated into the two-wheel drive vehicle, including placement of the engagement clutch assembly on the front hub of the vehicle. The clutch plates 221, 227 themselves could feature pressure plates or other alternatives to the dog-tooth gears disclosed herein. Additionally, the clutch plates 221, 227 may be made of light-weight aluminum and may be hard-coat anodized to increase strength. The engagement clutch 220 could also be positioned on the same side of the one-way rear hub as the rear drive sprockets (not shown). Additionally, the present embodiment uses a circular wave spring 237 to hold the inner and outer clutch plates 221, 227 apart. However, a variety of circular springs could be utilized. Finally, while the dimensions of an engagement clutch that fits within the standard rear wheel spacing is critical to the broadest application of standard industry equipment, including hubs and disk brake systems, alternative hub spacings are envisioned.

Fifth Embodiment of the Two-Wheel Drive Vehicle Featuring a Four-Bar Linkage Front Suspension for a Two-Wheel Drive Vehicle into the Front Fork Member FIG. 11 shows a view of a two-wheel drive vehicle 131 featuring integration of the front wheel drive into a four-bar linkage front suspension 132. This particular configuration is a popular design and could also be utilized, with slight modification, on a two-wheel drive motorcycle. Modifications would include the addition of meshing gears and symmetrical drive shafts, gears and components in the steering mechanism and front fork drive tubes as disclosed in the first embodiment. Additionally, components of the front wheel drive for the four-bar linkage front suspension 132 shown in FIG. 11 are integrated into the left linkage fork member 137. The four-bar linkage front suspension 132 also features a left rake adjuster bar 134 and a right rake adjuster bar (not shown) that allow the rider to adjust the rake (fork angle relative to the ground) of the two-wheel drive bicycle 131 depending upon riding conditions.

The four-bar linkage front suspension 132 is well known in the bicycle and motorcycle industries for its ability to absorb shock more into the frame of the vehicle and less into the steering mechanism and, thus, into the arms and shoulders of the rider. The front wheel drive includes a rear bevel gear 37 mounted on the rear hub 142 that meshes with and drives a drive shaft pinion gear 38 mounted on the rear end of the rear drive shaft 122. A telescoping rear ball spline universal joint system 113 attaches the front end of the rear drive shaft 122 to the rear end of a front linkage drive shaft 135. The front linkage drive shaft 135 includes a first front linkage drive gear 136 at its front end.

The four-bar linkage front suspension 132 of the fifth embodiment does not include a typical head tube configuration as shown in the previous embodiments. Rather, the four-bar linkage front suspension 132 is pivotally attached directly to the front end of the down drive tube 118 and the upper ends of the left fork post 133 and right fork post (not shown) via the left rake adjuster bar 134 and right rake adjuster bar (not shown) respectively. The linkage fork crown 138 then pivotally attaches with a ball and socket joint 139 to left front linkage arm 140 and right front linkage arm (not shown) and attaches the lower ends of the left fork post 133 and right fork post (not shown) to the upper ends of the left linkage fork member 137 and right linkage fork member (not shown) respectively.

The lower ends of the left linkage fork member 137 and the right linkage fork member (not shown) then attach to the front hub 141 at the left linkage fork dropout 143 and right linkage fork dropout (not shown). As illustrated, the "four-bar" linkage front suspension 132 forms a parallelogram and includes as its four "bars," the pivotable attachment of i) the front end of the down drive tube 118 to ii) the left rake adjuster bar 134 and the right rake adjuster bar (not shown) to iii) the upper ends of the left fork post 133 and the right fork post (not shown) respectively, and iv) the linkage fork crown 138 to the left front linkage arm 140 and right linkage arm (not shown) which then pivotally connect to the down drive tube 118.

In the present embodiment of the two-wheel drive vehicle 131, the first front linkage drive gear 136 meshes with and powers a second front linkage drive gear 144 located at the front end of the down drive tube 118 within the steering mechanism support casing 145 and immediately behind the steering mechanism support casing 145. The first front linkage drive gear 136 and second front linkage drive gear 144 interface very close to the axis of steering within the front end of the down drive tube 118 proximate the steering mechanism 130 and within the steering mechanism support casing 145.

The proximity of the first front linkage drive gear 136 and second front linkage drive gear 144 to the steering mechanism 130 and steering mechanism support casing 145 acts to minimize any torque reactions resulting from the rotation of the front wheel drive. Additionally, in the present embodiment, the first front linkage drive gear 136 and second front linkage drive gear 144 mesh at a 90 degree angle. However, meshing angles less than 90 degrees and more than 90 degrees are easily created and a 90 degree meshing angle should not be construed as limiting to the present invention.

The second front linkage drive gear 144 delivers power to the front wheel 17 through a short connecting shaft 92, a telescoping linkage ball spline universal joint system 146, the internal front linkage drive shaft 147 to an attached front linkage drive shaft gear 148. The front linkage drive shaft gear 148 then meshes with and drives the front bevel gear 32 which drives the front wheel 17. The telescoping linkage ball spline universal joint system 146 attaches to the second front linkage drive gear 144 through the short connecting shaft 92 very close to the axis of steering to minimize any torque reactions which would negatively affect steering. Additionally, an expandable universal joint system could be utilized in the front wheel drive of the four-bar linkage front suspension 132. Finally, a short connecting shaft 92 may be unnecessary in certain configurations featuring the telescoping front ball spline universal joint system 146 attached directly to the second front linkage drive gear 144.

An additional aspect of the two-wheel drive vehicle 131 shown in FIG. 11 is that the internal front linkage drive shaft 147 is enclosed within the left linkage fork member 137. Additionally, pivotally attached at the upper end of the left fork post 133 and right fork post (not shown) is a left rake adjuster bar 134 and right rake adjuster bar (not shown) respectively. Each rake adjuster bar has at least two front rake adjustment locations: a front rake adjustment location 149, and a rear rake adjustment location 150 to which the left fork post 133 and right fork post (not shown) can be optionally attached in order to enable the rider to adjust the rake of the two-wheel drive vehicle. By moving the location of the left fork post 133 and right fork post (not shown) from their respective front rake adjustment location 149 to the respective rear rake adjustment location 150 the rider can adjust the rake of the front fork to adapt to the riding conditions.

The disclosed adaptation of the front wheel drive for the two-wheel drive motorcycle to the four-bar linkage front suspension is not to be construed as limiting the present invention. Those skilled in the art will recognize alternative designs for linkage suspensions and corresponding locations of the front wheel drive. Additionally, the number of rake adjustment holes is not to be construed as limiting and each rake adjuster bar could easily consist of three or more rake adjustment holes.

Figure 12:
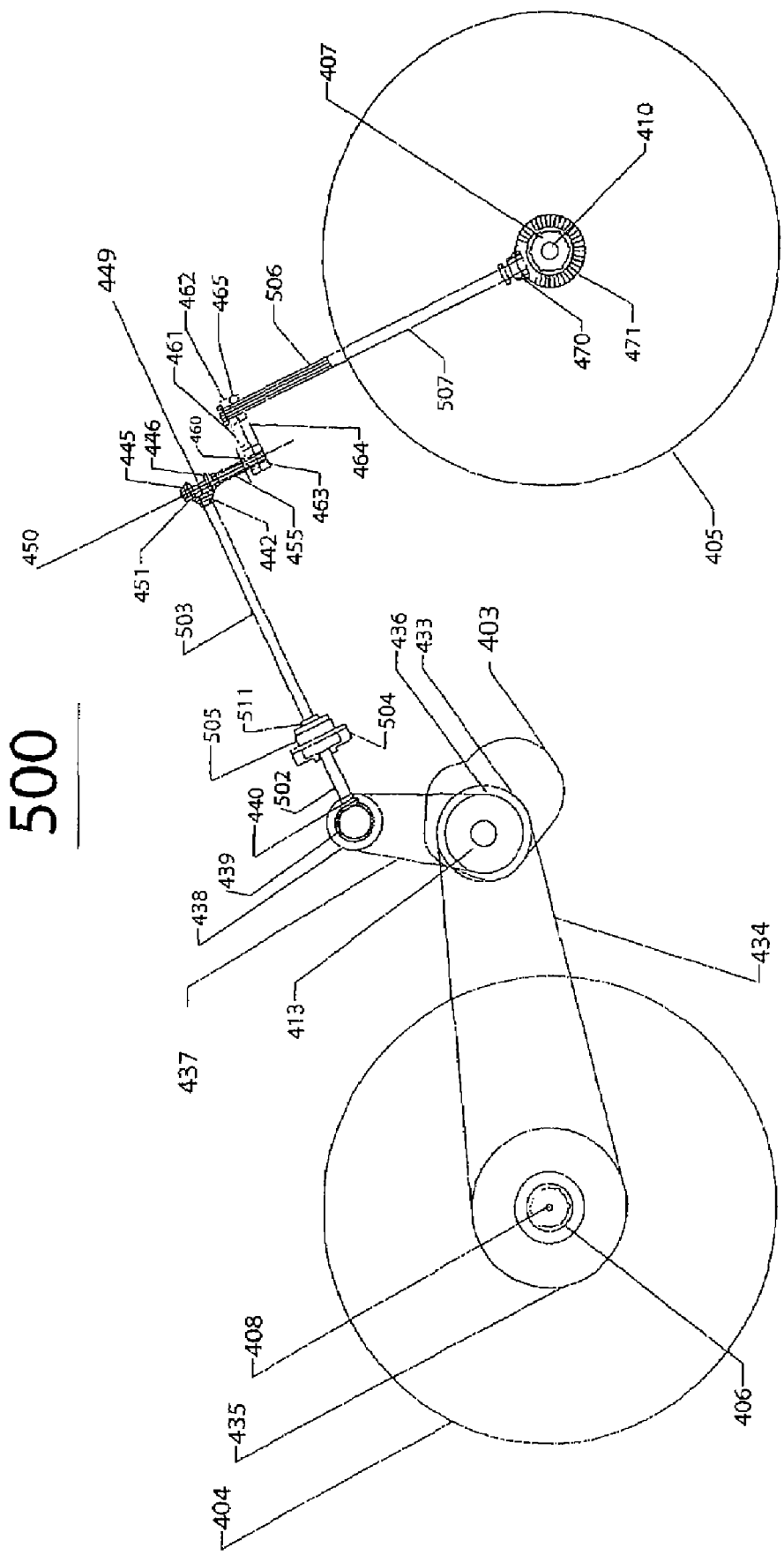
FIG. 12 is a side view of the rear wheel and front wheel drive system of a two wheel drive motorcycle featuring a torque limiting clutch along the front wheel drive system and further including sliding front shafts along the front fork that include ball bearings.

Sixth Embodiment of the Two-Wheel Drive Vehicle Illustrating a Torque Limiting Clutch Operatively Engaged with the Front Wheel Drive System Shaft FIG. 12 is a side view of the rear wheel and front wheel drive system of a two wheel drive motorcycle 500 featuring a torque limiting clutch 501. FIG. 13 is a side view of one example of a torque limiting clutch 501 that can be positioned along the front wheel drive system of the two wheel drive motorcycle 500. In the present embodiment, the torque limiting clutch 501 transfers power from a rear clutch drive shaft 502 to the rear clutch plate 504. The rear clutch plate 504 is in constant frictional contact with a front clutch plate 505 that is attached to the front clutch drive shaft 503.

Additionally, the rear clutch plate 504 and front clutch plate 505 are held in frictional contact with each other in a fashion where rotation of the rear clutch plate 504 causes rotation of the front clutch plate 505. This frictional contact results from the constant pressure of a spring 510 pushing the front clutch plate 505 against the rear clutch plate 504. The tension of the spring 510 is adjusted via tightening an adjustment nut 511 that is located on the front clutch drive shaft 503. As is well known by those familiar with these types of torque limiting devices tightening the adjustment nut 511 allows the torque limiting clutch 501 to be adjusted for various torque levels.

In the present embodiment, the torque limiting clutch 501 is located between the front drive gear 440 and the main drive gear 442. Power is transferred through the rotating front drive gear 440 to a rear clutch drive shaft 502 which is attached to the rear clutch plate 504. Constant frictional contact between the rear clutch plate 504 and the front clutch plate 505 cause the front clutch drive shaft 503 to rotate and transfer power to the head tube gear 442 and then to the front wheel drive system as described in the earlier embodiments.

As is well known in the art, the torque limiting clutch 501 can be adjusted to so that the rear clutch plate 504 slips relative to the front clutch plate 505 when excess power is transferred from the engine 402 through the front wheel drive system to the front wheel 405 of the two wheel drive motorcycle. In this fashion, the torque limiting clutch 501 acts as a fail-safe device to prevent catastrophic failure of the drive system. In alternative embodiments the torque limiting clutch 501 could be located between the front drive sprocket 438 and front drive gear 439 of the front wheel drive system. Finally, numerous configurations for the torque limiting clutch 501 are envisioned and the use and location of clutch plates 504, 505 and should not be construed as limiting the mechanisms by which extreme front wheel drive torque can be relieved. Any type of torque limiting clutches in addition to those discussed above, including but not limited to ball detent or spring detent torque limiting clutches may be used for this application, as is well known by those skilled in the art.

Seventh Embodiment of the Two-Wheel Drive Vehicle Illustrating Bearing-Supported Sliding Front Shafts FIG. 14 is a side view the sliding shafts 506, 507 of a the front wheel drive system of the two wheel drive motorcycle 500 that feature an improved method of sliding.

FIG. 12 is a side view of the same sliding shafts 506 and 507 as they are found in the front wheel drive system located along the right side of the two wheel drive motorcycle, along or collocated with the front fork. A similar set of sliding shafts (not shown) would be located long the left side of the two wheel drive motorcycle.

In the present embodiment, the upper sliding shaft 506 slides over the end of the lower sliding shaft 507 while transmitting the rotational power of the front wheel drive system to the front wheel as described in the previous embodiments. The ability of the upper sliding shaft 506 to slide smoothly over the lower sliding shaft 507 with minimal friction is critical to the smooth operation of the telescoping front fork of the motorcycle. As an improved feature over the splined shafts 466, 467 described in the earlier embodiments, FIG. 14 shows the placement of a series of needle bearings 508 between of upper sliding shaft 506 and the lower sliding shaft 507. The needle bearing act to minimize the friction that may otherwise occur between the sliding shafts 506 and 507 when rotational power is transferred through the front wheel drive system. Alternatively, as shown in FIG. 15, ball bearings 509, may be placed between the upper sliding shaft 506 and lower sliding shaft 507 to produce a similar friction-reducing effect on the expansion and contraction of the front wheel drive system during operation. In some embodiments of the invention, the sliding shafts 506, 507 can be positioned within the front fork or adjacent the front fork.

Finally, numerous configurations of bearing-supported sliding shaft systems and splined shaft systems as well as the use of other bearing or friction-reducing mechanisms are envisioned and the use and location of bearings and sliding shafts to reduce friction along the front wheel drive system should not be construed as limiting the mechanisms by which smooth operation of the motorcycle front fork can be achieved.

In considering this invention, it should be remembered that the present disclosure is only illustrative, and the scope of the invention is not intended to be limited to the embodiments disclosed herein. This invention discloses both the design and the construction of a two-wheel drive vehicle with a shock-absorbing front fork and rear suspension wherein the front wheel drive is entirely enclosed within the front fork. Additional embodiments disclose aspects of the front wheel drive that include a one-way front hub using a roller clutch, an engagement clutch, and a torque limiting clutch.

Importantly, the embodiments and inventions disclosed herein are useful and may be incorporated interchangeably into other embodiments. To illustrate the numerous scenarios, the two-wheel drive motorcycle 400 could also feature a front four-bar linkage suspension disclosed in the fifth embodiment of FIG. 11. Also, the one-way front hub with roller clutch 213 including a torque-limiting clutch 299 at its front wheel 17, as shown in the third embodiment could be utilized on the two-wheel drive motorcycle shown in the first and second embodiments. Also, while it is not common for a motorcycle to have a single crown fork, a single crown fork could also be adapted for application on other two-wheeled vehicles.

In accordance with the present invention, the transfer of the power from the center drive transmission or the rear wheel is accomplished through a rigid drive system, internal to the vehicle frame that enables a full range of steering, maintains vehicle aesthetics, and prevents rider injury from exposed front wheel drive parts. Importantly, positioning of front wheel drive components on the axis of steering and in a symmetrical and counterbalancing fashion relative to the centerline within the head tube, lower crown and fork tubes minimizes torque reactions from the rotation of the front wheel drive as the front wheel is driven. Furthermore, the rigid shaft system provides virtually instantaneous power transfer to the front wheel for any two-wheeled vehicle.

A two-wheel drive two-wheeled vehicle would have increased traction and mobility of the front wheel, especially during uphill climbs and downhill cornering on loose or slippery material. The shock-absorbing front fork and rear suspension ensures a smoother ride and greater contact of the front wheel with the terrain for all-around improved rider experience. The engagement clutch further enhances the utility of the front wheel drive providing the rider the option of rear-wheel-only or two-wheel drive. The invention discloses an excellent method of manufacturing a functional two-wheel drive two-wheeled vehicle, and in particular, a two-wheel drive motorcycle with all the disclosed embodiments. As envisioned, this fully integrated front wheel drive would not only compete with the most advanced vehicles on the market but would also create an entirely new category in numerous industries.

While the foregoing is directed to the first through fifth embodiments of the present invention, other and further embodiments of the invention may be devised without departing from the basic scope thereof, which scope is determined by the claims that follow.

What is claimed is:

1. An apparatus, comprising:
a drive gear disposed within a head tube of a two-wheeled vehicle;
a first fork shaft disposed adjacent a first fork member of the two-wheeled vehicle, the first fork shaft operably engaged with and configured to be driven by the drive gear, the first fork shaft defining a center line substantially parallel to an axis of steering of the two-wheeled vehicle; and
a second fork shaft disposed adjacent a second fork member of the two-wheeled vehicle, the second fork shaft operably engaged with and configured to be driven by the drive gear, the second fork shaft defining a center line substantially parallel to the axis of steering of the two-wheeled vehicle.

2. The apparatus of claim 1, wherein the center line of the first fork shaft is spaced apart from the axis of steering of the two-wheeled vehicle in a forward direction.

3. The apparatus of claim 1, wherein:
the first fork member is a first fork tube; and
at least a portion of the first fork shaft is disposed within the first fork tube.

4. The apparatus of claim 1, wherein:
the first fork shaft is configured to rotate about its center line in a first direction; and
the second fork shaft is configured to rotate about its center line in a second direction opposite the first direction.

5. The apparatus of claim 1, wherein the first fork shaft is a first fork shaft assembly including:
a first portion;
a second portion, at least a portion of the second portion being disposed within the first portion, the first portion and the second portion being engaged such that the first portion and the second portion rotate simultaneously; and
a bearing assembly disposed between the first portion and the second portion, the bearing assembly configured to allow the second portion to move relative to the first portion along the center line of the first fork shaft assembly.

6. An apparatus, comprising:
a drive mechanism configured to convey power to a front wheel of a two-wheeled vehicle, the drive mechanism including:
a first drive gear disposed within a head tube of the two-wheeled vehicle;
a second drive gear disposed within the head tube of the two-wheeled vehicle;
a first fork shaft disposed adjacent a first fork member of the two-wheeled vehicle, the first fork shaft configured to be driven by the first drive gear; and
a second fork shaft disposed adjacent a second fork member of the two-wheeled vehicle, the second fork shaft configured to be driven by the second drive gear.

7. The apparatus of claim 6, wherein the first drive gear is concentric with the second drive gear.

8. The apparatus of claim 6, wherein the first drive gear is configured to rotate about an axis of steering of the two-wheeled vehicle.

9. The apparatus of claim 6, wherein:
the first fork member is a first fork tube; and
at least a portion of the first fork shaft is disposed within the first fork tube.

10. The apparatus of claim 6, wherein:
the first fork shaft is configured to rotate in a first direction about a first axis substantially parallel to and offset from an axis of steering of the two-wheeled vehicle; and
the second fork shaft is configured to rotate in a second direction about a second axis substantially parallel to and offset from the axis of steering of the two-wheeled vehicle, the second direction being opposite the first direction.

11. The apparatus of claim 6, wherein:
the first fork shaft is configured to rotate about a first axis substantially parallel to an axis of steering of the two-wheeled vehicle, the first axis spaced apart from the axis of steering of the two-wheeled vehicle in a forward direction; and the second fork shaft is configured to rotate about a second axis substantially parallel to the axis of steering of the two-wheeled vehicle, the second axis spaced apart from the axis of steering of the two-wheeled vehicle in a forward direction.

12. The apparatus of claim 6, wherein the first fork shaft is configured to move along a first axis substantially parallel to an axis of steering of the two-wheeled vehicle with respect to the first drive gear.

13. The apparatus of claim 6, wherein the drive mechanism further includes:
a first driven gear coupled to an end portion of the first fork shaft such that the end portion of the first fork shaft can move axially within the first driven gear, the first driven gear operably engaged to the first drive gear; and
a second driven gear coupled to an end portion of the second fork shaft such that the end portion of the second fork shaft can move axially within the second driven gear, the second driven gear operably engaged to the second drive gear.

14. The apparatus of claim 6, wherein the first fork shaft is a first fork shaft assembly including:
a first portion;
a second portion, at least a portion of the second portion being disposed within the first portion, the first portion and the second portion being engaged such that the first portion and the second portion rotate simultaneously; and
a bearing assembly disposed between the first portion and the second portion, the bearing assembly configured to allow the second portion to move relative to the first portion along a center line of the first fork shaft assembly.

15. An apparatus, comprising:
a drive gear;
a first shaft having a first end coupled to a first gear and a second end coupled to a second gear, the first gear configured to engage the drive gear, the first shaft defining a center line substantially coaxial with an axis of steering of a two-wheeled vehicle;
a second shaft having a first end coupled to a third gear and a second end coupled to a fourth gear, the third gear configured to engage the drive gear, the second shaft defining a center line substantially coaxial with the axis of steering of the two-wheeled vehicle;
a right fork shaft disposed adjacent a right fork member of the two-wheeled vehicle, the right fork shaft configured to be driven by the second gear, the right fork shaft defining a center line substantially parallel to the axis of steering of the two-wheeled vehicle, the center line of the right fork shaft spaced apart from the axis of steering of the two-wheeled vehicle in a forward direction; and
a left fork shaft disposed adjacent a left fork member of the two-wheeled vehicle, the left fork shaft configured to be driven by the fourth gear, the left fork shaft defining a center line substantially parallel to the axis of steering of the two-wheeled vehicle, the center line of the left fork shaft spaced apart from the axis of steering of the two-wheeled vehicle in a forward direction.

16. The apparatus of claim 15, wherein at least one of the second gear and the fourth gear is disposed within a fork crown of the two-wheeled vehicle.

17. The apparatus of claim 15, wherein:
at least a portion of the first shaft is disposed within a head tube of the two-wheeled vehicle; and
at least a portion of the second shaft is disposed within the first shaft.

18. The apparatus of claim 15, wherein:
the right fork member is a right fork tube; and
at least a portion of the right fork shaft is disposed within the right fork tube.

19. The apparatus of claim 15, wherein:
the right fork shaft is configured to rotate about its center line in a first direction; and
the left fork shaft is configured to rotate about its center line in a second direction opposite the first direction.

20. The apparatus of claim 15, wherein the right fork shaft is a right fork shaft assembly including:
a first portion;
a second portion, at least a portion of the second portion being disposed within the first portion, the first portion and the second portion being engaged such that the first portion and the second portion rotate simultaneously; and
a bearing assembly disposed between the first portion and the second portion, the bearing assembly configured to allow the second portion to move along the center line of the right fork shaft assembly relative to the first portion.

21. An apparatus, comprising:
a drive gear disposed within a head tube of a two-wheeled vehicle, the drive gear configured to rotate about an axis of steering of the two-wheeled vehicle;
a first fork shaft disposed adjacent a first fork member of the two-wheeled vehicle, the first fork shaft operably engaged with and configured to be driven by the drive gear, the first fork shaft defining a center line; and
a second fork shaft disposed adjacent a second fork member of the two-wheeled vehicle, the second fork shaft operably engaged with and configured to be driven by the drive gear, the second fork shaft defining a center line,
the center line of the first fork shaft and the center line of the second fork shaft collectively defining a fork shaft plane, the axis of steering of the two-wheeled vehicle being disposed outside of the fork shaft plane.

22. The apparatus of claim 21, wherein the axis of steering of the two-wheeled vehicle is spaced apart from the fork shaft plane in a rearward direct.

* * * * *

UNITED STATES PATENT AND TRADEMARK OFFICE
CERTIFICATE OF CORRECTION

PATENT NO. : 7,487,854 B2 Page 1 of 1
APPLICATION NO. : 11/968820
DATED : February 10, 2009
INVENTOR(S) : Steven J. Christini et al.

It is certified that error appears in the above-identified patent and that said Letters Patent is hereby corrected as shown below:

Column 30, line 54 (claim 22), replace "rearward direct" with --rearward direction--.

Signed and Sealed this

Seventeenth Day of August, 2010

David J. Kappos
*Director of the United States Patent and Trademark Office*